(12) United States Patent
Gupta

(10) Patent No.: US 10,185,934 B2
(45) Date of Patent: Jan. 22, 2019

(54) REAL-TIME CONTEXT AWARE RECOMMENDATION ENGINE BASED ON A USER INTERNET OF THINGS ENVIRONMENT

(71) Applicant: QUALCOMM Incorporated, San Diego, CA (US)

(72) Inventor: Binita Gupta, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 500 days.

(21) Appl. No.: 14/324,917

(22) Filed: Jul. 7, 2014

(65) Prior Publication Data

US 2015/0019342 A1     Jan. 15, 2015

Related U.S. Application Data

(60) Provisional application No. 61/844,359, filed on Jul. 9, 2013.

(51) Int. Cl.
  *G06Q 10/00*     (2012.01)
  *G06Q 30/02*     (2012.01)
(52) U.S. Cl.
  CPC ......... *G06Q 10/20* (2013.01); *G06Q 30/0269* (2013.01)
(58) Field of Classification Search
  CPC .................................................. G06Q 10/20
  (Continued)

(56) References Cited

U.S. PATENT DOCUMENTS 8,010,645 B2    8/2011  Shivaji Rao
8,195,475 B1 *  6/2012  Landsman .......... G06F 19/3431
                                                    705/2

(Continued)

FOREIGN PATENT DOCUMENTS

JP   2011138492 A   7/2011
WO   2013019307 A1  2/2013

OTHER PUBLICATIONS

International Search Report and Written Opinion—PCT/US2014/45726—ISA/EPO—dated Sep. 3, 2015.

(Continued)

*Primary Examiner* — Jamie R Kucab
(74) *Attorney, Agent, or Firm* — Muncy, Geissler, Olds & Lowe, P.C.

(57) ABSTRACT

The disclosure relates to a recommendation engine that may monitor, aggregate, filter, and otherwise process relevant information associated with a user Internet of Things (IoT) environment to provide personal and context-aware recommendations based on relevant real-time knowledge about various IoT devices and other items in the IoT environment. For example, the recommendations may be generated based on ranked associations between the user and the various items in the IoT environment, which may be determined from profiles, states, usage patterns, proximities, and other contextually relevant information about the IoT environment. Furthermore, the recommendations may be uploaded to a recommendation data server, shared with friends, or otherwise used to provide similar recommendations to other users, and in a similar respect, the recommendations may be based on information stored on the recommendation data server and/or recommendations provided to friends or other users having similar profiles to the user.

25 Claims, 14 Drawing Sheets

(58) Field of Classification Search
USPC .......................................................... 705/305
See application file for complete search history.

(56) References Cited

U.S. PATENT DOCUMENTS

| | | | |
|---|---|---|---|
| 2002/0006602 A1* | 1/2002 | Masters ................. | G09B 25/04 434/72 |
| 2003/0200131 A1* | 10/2003 | Gabbert ............. | G06Q 30/0203 705/7.32 |
| 2004/0153373 A1 | 8/2004 | Song et al. | |
| 2006/0101742 A1* | 5/2006 | Scott-Leikach ....... | G06F 17/509 52/235 |
| 2007/0152048 A1 | 7/2007 | Jung et al. | |
| 2008/0189389 A1* | 8/2008 | Waldinger .............. | G06F 17/30 709/218 |
| 2008/0306895 A1* | 12/2008 | Karty ..................... | G06Q 10/04 706/52 |
| 2009/0160856 A1* | 6/2009 | Hoguet .................. | G06Q 10/06 345/420 |
| 2010/0228767 A1 | 9/2010 | Slinker et al. | |
| 2011/0208790 A1 | 8/2011 | Sakata et al. | |
| 2012/0079091 A1 | 3/2012 | Ermis et al. | |
| 2012/0231424 A1 | 9/2012 | Calman et al. | |
| 2013/0033178 A1 | 2/2013 | Huang | |
| 2013/0046623 A1 | 2/2013 | Moritz et al. | |
| 2013/0085886 A1 | 4/2013 | Satish et al. | |
| 2013/0086082 A1 | 4/2013 | Park et al. | |
| 2013/0124449 A1 | 5/2013 | Pinckney et al. | |
| 2013/0173621 A1 | 7/2013 | Kapoor et al. | |
| 2013/0174273 A1 | 7/2013 | Grab et al. | |
| 2013/0222393 A1* | 8/2013 | Merrell ................... | G06T 11/00 345/441 |
| 2014/0172479 A1* | 6/2014 | Gallagher ...... | G06Q 10/063114 705/7.15 |
| 2014/0188604 A1* | 7/2014 | Muir .................. | G06Q 30/0251 705/14.51 |
| 2014/0278786 A1* | 9/2014 | Liu-Qiu-Yan ...... | G06Q 30/0201 705/7.32 |
| 2014/0298230 A1* | 10/2014 | Priest .................. | G06F 3/04842 715/771 |
| 2017/0262923 A1* | 9/2017 | Bute ....................... | H04L 67/12 |
| 2018/0293103 A1* | 10/2018 | Kalmus ................. | G06F 9/5005 |

OTHER PUBLICATIONS

Guo B., et al., "From the Internet of things to embedded intelligence," 2012, pp. 1-29.

Li B., "Research on Mobile Context Aware and Personalized Recommender Service," Journal of Network & Information Security, 2013, vol. 4 (3), pp. 223-228.

Yamazaki T., "The Ubiquitous Home," International Journal of Smart Home, Jan. 2007, vol. 1 (1), pp. 17-22.

Munoz-Organero M., et al., "A Collaborative Recommender System Based on Space-Time Similarities," IEEE Pervasive Computing, Jul.-Sep. 2010, vol. 9 (3), pp. 81-87.

"Remote Monitoring and Tracking of Content in an Internet Connected Refrigerator Using Webcams, Augmented Reality, and Mobile Devices", ip.com journal, ip.com inc., West Henrietta, NY, US, Jul. 1, 2013 (Jul. 1, 2013), XP013158002, ISSN: 1533-0001, 5 pages.

Supplementary European Search Report—EP14748337—Search Authority—The Hague—dated Dec. 13, 2016.

Swan M, "Sensor Mania! The Internet of Things, Wearable Computing, Objective Metrics, and the Quantified Self 2.0," Journal of Sensor and Actuator Networks, Nov. 8, 2012 (Nov. 8, 2012), vol. 1(3), pp. 217-253, XP055215383, DOI: 10.3390/jsan1030217.

Zhang Y., et al., "Context-Aware Commodity Recommendation Information Service in E-commerce," Internet Computing for Science and Engineering (ICICSE), 2012 Sixth International Conference on, IEEE, Apr. 21, 2012 (Apr. 21, 2012), pp. 20-25, XP032201552, DOI: 10.1109/ICICSE.2012.31 ISBN: 978-1-4673-1683-5.

* cited by examiner

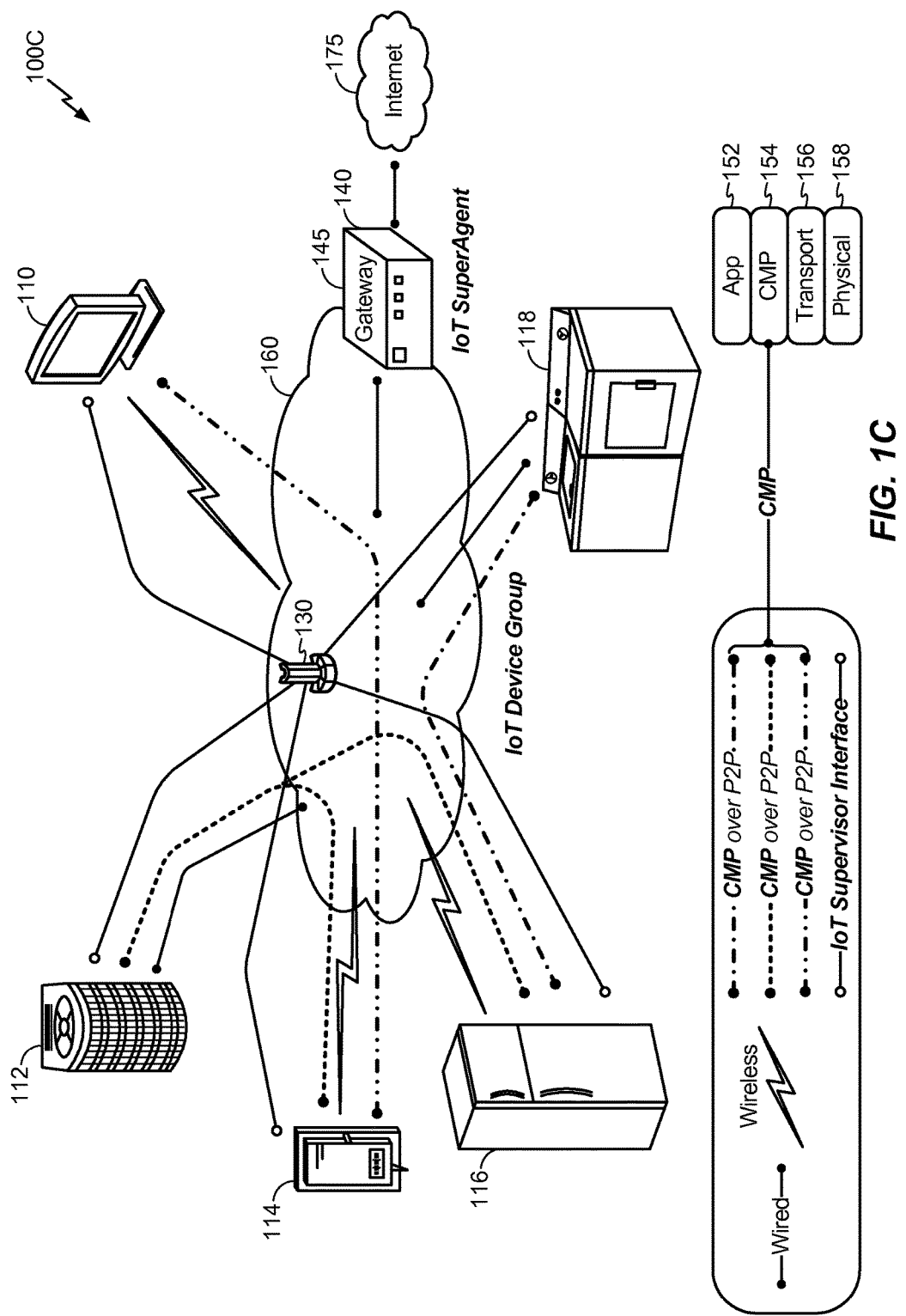

REAL-TIME CONTEXT AWARE RECOMMENDATION ENGINE BASED ON A USER INTERNET OF THINGS ENVIRONMENT

CROSS-REFERENCE TO RELATED APPLICATIONS

The present application for patent claims the benefit of Provisional Patent Application No. 61/844,359 entitled "REAL-TIME CONTEXT AWARE RECOMMENDATION ENGINE BASED ON A USER INTERNET OF THINGS ENVIRONMENT," filed on Jul. 9, 2013, which is assigned to the assignee hereof and hereby expressly incorporated herein by reference in its entirety.

TECHNICAL FIELD

Various embodiments described herein are generally directed to providing real-time context aware recommendations to a user based on information about an Internet of Things (IoT) environment, and in particular, to a recommendation engine that may monitor, aggregate, filter, and otherwise process relevant information associated with various IoT devices and other items in the IoT environment to provide personalized recommendations based on relevant real-time knowledge about various things in the IoT environment.

BACKGROUND

The Internet is a global system of interconnected computers and computer networks that use a standard Internet protocol suite (e.g., the Transmission Control Protocol (TCP) and Internet Protocol (IP)) to communicate with each other. The Internet of Things (IoT) is based on the idea that everyday objects, not just computers and computer networks, can be readable, recognizable, locatable, addressable, and controllable via an IoT communications network (e.g., an ad-hoc network or the Internet).

A number of market trends are driving development of IoT devices. For example, increasing energy costs are driving governments' strategic investments in smart grids and support for future consumption, such as for electric vehicles and public charging stations. Increasing health care costs and aging populations are driving development for remote/connected health care and fitness services. A technological revolution in the home is driving development for new "smart" services, including consolidation by service providers marketing 'N' play (e.g., data, voice, video, security, energy management, etc.) and expanding home networks. Buildings are getting smarter and more convenient as a means to reduce operational costs for enterprise facilities.

There are a number of key applications for the IoT. For example, in the area of smart grids and energy management, utility companies can optimize delivery of energy to homes and businesses while customers can better manage energy usage. In the area of home and building automation, smart homes and buildings can have centralized control over virtually any device or system in the home or office, from appliances to plug-in electric vehicle (PEV) security systems. In the field of asset tracking, enterprises, hospitals, factories, and other large organizations can accurately track the locations of high-value equipment, patients, vehicles, and so on. In the area of health and wellness, doctors can remotely monitor patients' health while people can track the progress of fitness routines. As such, in the near future, increasing development in IoT technologies will lead to numerous IoT devices surrounding a user at home, in vehicles, at work, and many other locations. However, despite the fact that IoT capable devices can provide substantial real-time information about the environment surrounding a user (e.g., likes, choices, habits, device conditions and usage patterns, etc.), known conventional personal recommendation engines typically lack the ability to adequately monitor, aggregate, filter, and otherwise process all available information that may be relevant to providing personalized recommendations to users. For example, known conventional personal recommendation engines typically provide recommendations based on user online purchase histories and correlations with other users who may have purchased or expressed interest in similar items based on knowledge from only one or a limited set of online sites (e.g., Amazon.com or Overstock.com). The recommendations that existing engines provide therefore tend to be limited in that the recommendations are based on a small set of products or services that the user bought from that online site and therefore may not be the best or most relevant recommendation to the user. Furthermore, because existing recommendation engines typically do not know whether a purchased item was bought for the user or as a gift for someone else, any future recommendations to the user that are based on that item may not be particularly relevant.

Accordingly, a need exists for a recommendation engine that can provide personal recommendations having contextual relevance based on real-time knowledge about the environment surrounding a user and the things that the user has and interacts with therein.

SUMMARY

The following presents a simplified summary relating to the real-time context aware recommendation engine disclosed herein in order to provide a basic understanding of such embodiments. As such, this summary should not be considered an extensive overview of all contemplated embodiments, nor is this summary intended to identify key or critical elements of all embodiments described herein or delineate the scope of any particular embodiment. Accordingly, the sole purpose of this summary is to present certain concepts relating to one or more embodiments relating to the real-time context aware recommendation engine disclosed herein in a simplified form as a prelude to the more detailed description presented below.

The disclosure generally relates to a recommendation engine that may monitor, aggregate, filter, and otherwise process relevant information associated with a user's Internet of Things (IoT) environment to provide personal and context-aware recommendations based on relevant real-time knowledge about various IoT devices and other items in the IoT environment. For example, the recommendation engine may generate the recommendations based on ranked associations between the user and the various items in the IoT environment, which may be determined from profiles, states, usage patterns, proximities, and other contextually relevant information about the IoT environment. Furthermore, the recommendations may be uploaded to a recommendation data server, shared with friends, or otherwise used to provide similar recommendations to other users, and in a similar respect, the recommendations may be based on information stored on the recommendation data server and similar recommendations provided to friends or other users.

According to one exemplary aspect, a personal context aware recommendation engine can be developed utilizing real-time information from a user IoT environment, wherein the real-time information may include device profiles, device states, user profiles, and device usage patterns, and other relevant information that the recommendation engine may fetch or otherwise obtain from one or more IoT devices in the IoT environment around the user. For example, in one embodiment, the IoT devices can include, without limitation, home appliances, multimedia systems, home security systems, motor vehicles. As such, in one exemplary use case, the IoT devices can include one or more user devices that store perishable or other consumable goods (e.g., a refrigerator, wine cooler, pantry, etc.). In this exemplary use case, the device profiles can therefore include details about the devices (e.g., an LG® stainless steel refrigerator with a French door), the device states can include operative conditions associated with the devices and/or inventories and ages associated with the goods or foodstuffs stored therein, and the user profiles and usage patterns can be derived from user interactions with the IoT devices in combination with other information sources (e.g., user purchasing histories, demographic data, user input, resource availability, user likes, choices, and habits, the user IoT environment at different locations, etc.). In another exemplary use case, the recommendation engine could provide recommendations for clothes based on coordination with clothes that the user already has (e.g., certain tops or shirts that match jeans or skirts that the user already owns may be recommended).

According to another exemplary aspect, the recommendation engine can automatically form associations between IoT devices and users based on the device profiles, device states, user profiles, device usage patterns, user proximities, times, locations, or other suitable information having contextual relevance to the IoT environment. For example, in one embodiment, the associations can define one or more IoT devices that are shared among multiple users (e.g., kitchen appliances, faucets, etc.) and/or one or more IoT devices that are specific to a particular user (e.g., a car having a primary driver). In one embodiment, proximity between IoT devices can be used to form associations between IoT devices and particular users (e.g., a shoe may be associated with a female head-of-household in response to detecting that the shoe is in proximity to the female head-of-household's mobile phone 90% of the time using a short-range communication mechanism such as Bluetooth). Furthermore, the proximities used to form the associations can define relationships between certain IoT devices and locations where specific users typically interact with the IoT devices (e.g., shoes that a person only wears at home). In one embodiment, the recommendation engine may further assign rankings to IoT devices, which may differentiate multiple IoT devices that have the same or substantially similar user associations, and the recommendation engine may further use the rankings to provide the recommendations. For example, different IoT devices having a similar type can be ranked, different modes in which multi-use IoT devices can be used or otherwise operated can be ranked, and IoT devices having different types or classifications can be ranked (e.g., certain prescription refills may have higher rankings than red wine that needs to be re-stocked), wherein the rankings may be based on device usage patterns and respective functionalities that the devices provide (e.g., a refrigerator may be ranked higher than a grill because the refrigerator is used more often). Furthermore, certain device rankings may be applicable to all users because the devices are common in certain locations (e.g., a stove may be ranked higher than a juicer because all users may interact therewith and certain users interact with the juicer more often than other users), certain rankings may be specific to certain users (e.g., a mother may prefer casual shoes from Nordstrom and may therefore have high-end shoes ranked higher ranking than other casual shoes), and in certain cases, rankings for the same item may differ from one user to another based on usage patterns, proximities, or other relevant factors (e.g., a surround system may have a higher ranking when associated with a father that uses the surround system frequently and a lower ranking when associated with a mother that uses the surround system infrequently).

According to another exemplary aspect, the recommendation engine may characterize or otherwise classify a personal space in the user IoT environment (e.g., home, car, office, etc.) based on certain IoT devices present in that personal space. For example, in one embodiment, a personal space in the IoT environment may comprise a kitchen, and the recommendation engine may assign a "stainless steel" theme or classification to the kitchen based on the kitchen including all stainless steel appliances or more stainless steel appliances than any other type. As such, the theme or classification assigned to the personal space can be used to make contextually relevant recommendations to a user interested in buying other appliances, kitchen furniture, or other kitchen items. Similarly, the recommendation engine can assign a "contemporary" theme or classification to a house in the IoT environment based on furniture and décor in the house. According to another aspect, the recommendation engine may learn more detailed characteristics associated with the personal spaces from suitable information sources (e.g., the recommendation engine may obtain a house layout or floor-plan from public housing records, paint colors used in the house from inputs that the user provides, styles associated with furniture or decorations in a house based on inputs scanning quick response codes on those items, etc.). Accordingly, the themes or classifications assigned to personal spaces in the IoT environment may be considered to recommend relevant products or services (e.g., friends or other users with a contemporary house theme bought certain sectional sofas, friends or other people with a gray leather sectional sofa bought certain console tables, friends or other users with yellow living room walls bought certain paintings, etc.). Furthermore, in one embodiment, the recommendations based on the themes or classifications may be determined based on information obtained from the recommendation data server, friends recommendation engines, or other suitable information sources.

According to another exemplary aspect, the recommendation engine may automatically build and enhance the user profiles based on IoT device usage patterns that the recommendation engine learns over time in combination with other suitable input (e.g., user purchase histories, user online profiles, user demographics, user activities, user inputs, etc.). For example, a particular user could have a health-conscious male profile based on the groceries that the user typically buys, appliances that the user typically interacts with (e.g., a juicer versus a coffee-maker), exercise habits, or other real-time knowledge relating to user context, wherein the health-conscious male profile may be taken into account to provide appropriately relevant food item recommendations. In another example, user profile information from multiple family members may be used when recommending items to any family member (e.g., if the recommendation engine determines that both parents in a household like Starbucks based on their purchase histories, online profiles, etc., a recommendation to purchase a Starbucks coffee-maker may be provided).

According to another exemplary aspect, the recommendation engine may proactively recommend certain actions, events, activities, or other items that may be relevant or helpful to users according to various criteria and objectives and based on real-time knowledge about the IoT devices in the environments surrounding the users and the profiles associated with the users. For example, one objective may be to efficiently expend available resources in the user's IoT environment (e.g., recommending recipes that use groceries nearing expiration dates, recommending combining a shopping trip to buy batteries from a store in proximity to a grocery store where a user plans to shop in order to save time, etc.). In another example, recommendations relating to certain things that need to be taken care of around the house may be provided based on real-time IoT device state information (e.g., the recommendations may indicate that an oven needs to be fixed, light bulbs in a guest bedroom need to be replaced, smoke detector batteries are due to be changed, etc.). Further still, the recommendation engine may recommend certain activities (e.g., weekend activities) based on real-time knowledge about the IoT devices in one or more environments surrounding the users and online profiles associated therewith (e.g., recommend a trip to SeaWorld if the user has a pass to SeaWorld and has not visited there in a while, recommend toddler-friendly activities to parents of a toddler, etc.).

According to another exemplary aspect, the real-time information that the recommendation engine utilizes to make the personal recommendations based on the user IoT environment may generally comprise n-tuple information that the recommendation engine can receive, fetch, aggregate, filter, generate, or otherwise obtain from IoT devices surrounding the user within the IoT environment. More particularly, in one embodiment, the n-tuple information may include, among other things, profiles, states, contexts, usage patterns, user associations, location or personal space associations, temporal associations, rankings, or other relevant information associated with the IoT devices in the user environment. Furthermore, in one embodiment, the n-tuple information may further include user profiles (e.g., user-specific profiles, multi-user profiles, etc.), analytics data that the IoT devices may generate and provide to the recommendation engine, and/or user inputs that define, classify, or otherwise characterize passive devices that do not have communication capabilities and/or devices that are otherwise not connected to the IoT network (e.g., information about passive devices may be obtained via quick response codes). Furthermore, in one embodiment, the recommendation engine can upload the n-tuple information or any other relevant real-time information about the user IoT environment to a recommendation data server to provide a larger, community-based knowledge source that can be used to make contextual recommendations to the user and/or other users. In one embodiment, the recommendation engine may enable the user to approve or disapprove uploading the relevant information to the recommendation data server and/or control the access that other users have to information uploaded to the recommendation data server. For example, the user may only allow users in a friends list (e.g., Facebook friends) to have access to the uploaded information, only allow other users to access certain uploaded information (e.g., restricting access to potentially sensitive information), make certain uploaded information publicly accessible, or any suitable combination thereof.

Accordingly, the recommendation engine can generally identify and provide the user with recommendations based on information from various knowledge sources associated with the IoT environment, which may include the n-tuple information obtained from the IoT devices in the environment, the analytics data that the IoT devices generate, information obtained from the recommendation data server, information obtained from other sites having relevance to certain contexts (e.g., Houzz.com may be considered relevant to recommendations that relate to remodeling or house decoration projects), user preferences and other profile information relevant to the IoT environment (e.g., the ranked associations between users, personal spaces, or other aspects associated with the IoT environment), information obtained from friend recommendation engines, and user inputs that provide details about the environment surrounding the user that cannot be readily or automatically learned directly from the user IoT environment (e.g., paint colors used in a house), among other things. As such, the recommendation engine may employ or otherwise implement the various aspects described above to provide context aware recommendations on everyday things (e.g., recipes, weekend activities, house activities, etc.), specific things that the user may be looking to buy, or any other suitable aspect that may have relevance to the user based on various real-time information sources.

According to another exemplary aspect, the recommendation engine may generate search criteria to look for relevant items on appropriate external e-commerce websites (e.g. Amazon.com or Overstock.com) based on information from various knowledge sources associated with the IoT environment that may include information collected from IoT devices, device associations and rankings, user profiles, the recommendation data server, friends recommendation engines, IoT analytics, or other sites having relevance to certain contexts, among other things. The recommendation engine may further filter and/or prioritize the search results obtained from the external e-commerce websites prior to making recommendations to the user based on the search results to further ensure that the recommendations match and are in accordance with knowledge obtained and derived from information collected from the user's IoT environment.

According to one exemplary aspect, a recommendation engine implementing one or more features described in further detail above may perform a method for providing personalized recommendations that comprises, among other things, collecting information associated with a user environment that includes one or more IoT devices, wherein the collected information includes usage information associated with the one or more IoT devices in the user environment (e.g., device profiles, device states, user profiles, device usage patterns, user proximities, times, locations, or other information having contextual relevance to the user environment), constructing a profile associated with the user based at least in part on the usage information associated with the one or more IoT devices, and recommending an item (e.g., an activity, an event, a product, a service, etc.) to the user based at least in part on the collected information associated with the user environment and the constructed profile associated with the user. Furthermore, in one embodiment, the user environment may comprise a personal space (e.g., a room) and the method may further comprise assigning a theme to the personal space based at least in part on the collected information associated with the one or more IoT devices in the personal space (e.g., a décor of the room), wherein recommending the item to the user is further based at least in part on the assigned theme (e.g., a theme that classifies the décor in the room as one of a plurality of given decors). In one embodiment, assigning the theme to the personal space may further comprise determining an inventory associated with the personal space based at least in part on the collected information associated with the one or more IoT devices in the personal space and any user input defining unconnected items in the personal space. The theme may then be assigned to the personal space in response to determining that the inventory associated with the personal space satisfies one or more rules associated with the assigned theme, or the theme assigned to the personal space may alternatively be defined or augmented in response to determining that the inventory associated with the personal space does not satisfy one or more rules associated with any predefined themes.

According to another exemplary aspect, the collected information associated with the user environment may include, among other things, profile information associated with the one or more IoT devices, and the method may further comprise detecting frequent proximity between the user and one or more IoT devices among the IoT devices and associating at least one of the IoT devices with the user based at least in part on the profile information associated with the one or more IoT devices and the detected proximity. Additionally, in one exemplary use case, the one or more IoT devices may be ranked according to an importance to the user based at least in part on the usage information, wherein the one or more IoT devices are ranked, wherein the item may be recommended to the user based further in part on the rankings associated with the one or more IoT devices. In another exemplary use case, the environment may comprise a residence and the collected information may comprise floor plan information and current décor information associated with the residence, wherein the item may be recommended to the user in response to a search for furnishing to purchase for the residence such that the recommended item may include one or more furnishing items that are concurrently compatible with the floor plan information, the current décor information, and a likely furnishing preference determined from the profile associated with the user.

According to another exemplary aspect, the method that the recommendation engine performs may further comprise ranking the one or more IoT devices based on functionality associated therewith, the usage information that corresponds to the user, additional usage information that corresponds to one or more other users, and/or similarities in the respective functionalities associated with the one or more IoT devices, whereby the recommendation engine may generate multiple rankings of the one or more IoT devices according to the importance to the user and an importance to the one or more other users. As such, in one embodiment, the recommendation engine may select the item recommended to the user based on an association with an IoT device that has a high ranking among the ranked IoT devices. Furthermore, in one embodiment, the recommendation engine may upload the collected information associated with the user environment (e.g., the usage information associated with the one or more IoT devices in the user environment) to a recommendation data server that makes the uploaded information available to a trusted set of users, or the recommendation engine may alternatively make the uploaded information available to the trusted set of users without uploading the collected information to the recommendation data server. In one embodiment, the method that the recommendation engine performs may further comprise accessing recommendations provided to other users that have profiles similar to the constructed profile associated with the user from the recommendation data server, acquiring recommendations provided to one or more users in the trusted set of users that have profiles similar to the constructed profile associated with the user, and fetching data from one or more web sites having a context similar to the constructed profile associated with the user. Alternatively (or additionally), the recommendation engine may recommend the item to the user to improve a state associated with a resource in the user environment, efficiently use the resource in the user environment, or otherwise optimize resource usage or availability in the user environment. Furthermore, in one embodiment, the recommendation engine may provide a recommendation application that can receive input from the user in order to enable the user to specify further information associated with the user environment that was not collected or cannot be collected from the one or more IoT devices in the user environment. In another embodiment, the recommendation engine may support learning information about certain things in the user's IoT environment via scanning quick response codes associated therewith.

Other objects and advantages associated with the real-time context aware recommendation engine described herein will be apparent to those skilled in the art based on the accompanying drawings and detailed description.

BRIEF DESCRIPTION OF THE DRAWINGS

A more complete appreciation of aspects of the disclosure and many of the attendant advantages thereof will be readily obtained as the same becomes better understood by reference to the following detailed description when considered in connection with the accompanying drawings which are presented solely for illustration and not limitation of the disclosure, and in which:

FIG. 1C illustrates a high-level system architecture of a wireless communications system in accordance with an aspect of the disclosure.

FIG. 2A illustrates an exemplary Internet of Things (IoT) device in accordance with aspects of the disclosure, while

DETAILED DESCRIPTION

Figure 1A:
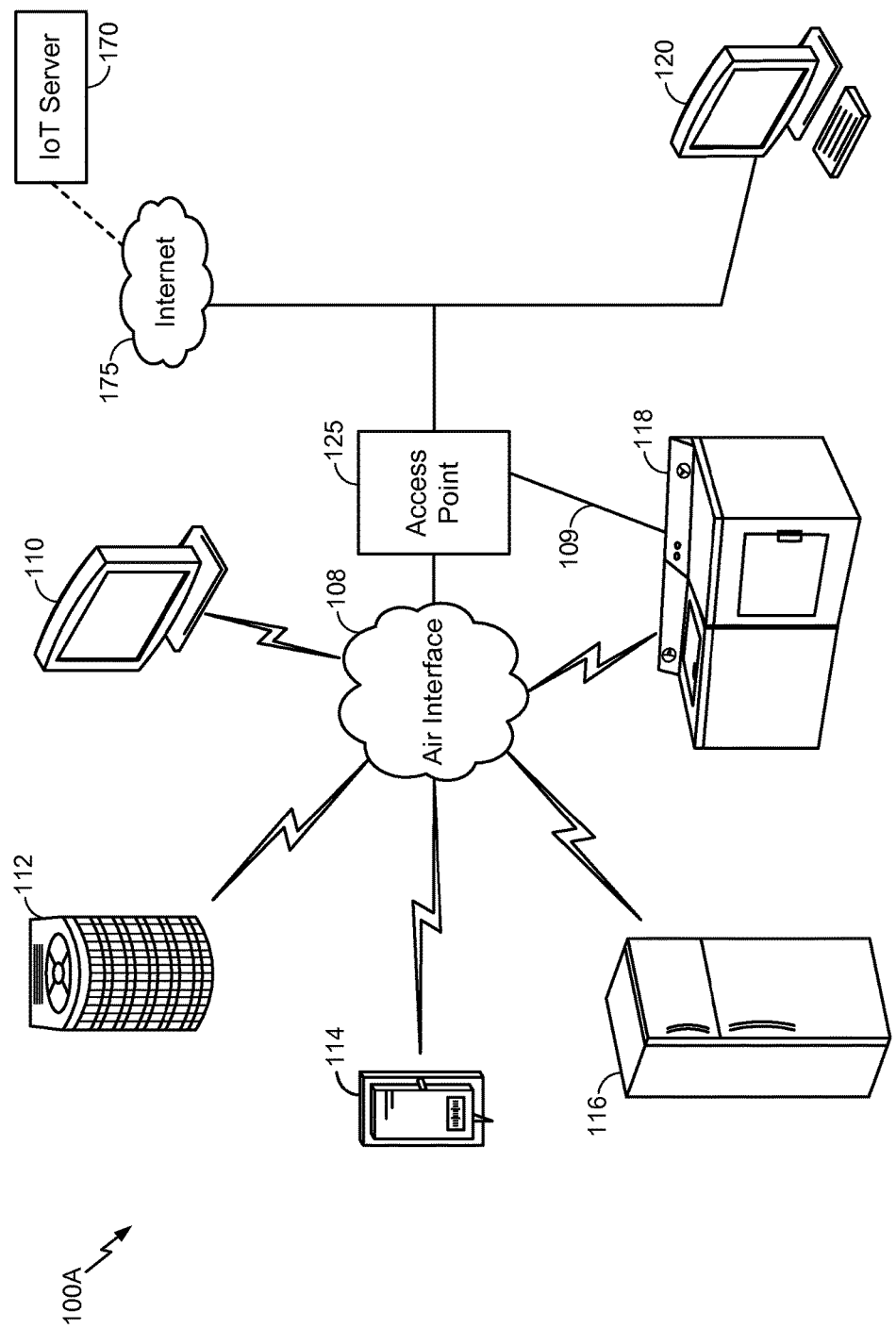
FIG. 1A illustrates a high-level system architecture of a wireless communications system in accordance with an aspect of the disclosure.

Various aspects are disclosed in the following description and related drawings to show specific examples relating to exemplary embodiments of a recommendation engine that may provide real-time context aware recommendations based on a user Internet of Things (IoT) environment. Alternate embodiments will be apparent to those skilled in the pertinent art upon reading this disclosure, and may be constructed and practiced without departing from the scope or spirit of the disclosure. Additionally, well-known elements will not be described in detail or may be omitted so as to not obscure the relevant details of the aspects and embodiments disclosed herein.

The word "exemplary" is used herein to mean "serving as an example, instance, or illustration." Any embodiment described herein as "exemplary" is not necessarily to be construed as preferred or advantageous over other embodiments. Likewise, the term "embodiments" does not require that all embodiments include the discussed feature, advantage or mode of operation.

The terminology used herein describes particular embodiments only and should not be construed to limit any embodiments disclosed herein. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Further, many aspects are described in terms of sequences of actions to be performed by, for example, elements of a computing device. It will be recognized that various actions described herein can be performed by specific circuits (e.g., an application specific integrated circuit (ASIC)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the term "Internet of Things device" (or "IoT device") may refer to any object (e.g., an appliance, a sensor, etc.) that has an addressable interface (e.g., an Internet protocol (IP) address, a Bluetooth identifier (ID), a near-field communication (NFC) ID, etc.) and can transmit information to one or more other devices over a wired or wireless connection. An IoT device may have a passive communication interface, such as a quick response (QR) code, a radio-frequency identification (RFID) tag, an NFC tag, or the like, or an active communication interface, such as a modem, a transceiver, a transmitter-receiver, or the like. An IoT device can have a particular set of attributes (e.g., a device state or status, such as whether the IoT device is on or off, open or closed, idle or active, available for task execution or busy, and so on, a cooling or heating function, an environmental monitoring or recording function, a light-emitting function, a sound-emitting function, etc.) that can be embedded in and/or controlled/monitored by a central processing unit (CPU), microprocessor, ASIC, or the like, and configured for connection to an IoT network such as a local ad-hoc network or the Internet. For example, IoT devices may include, but are not limited to, refrigerators, toasters, ovens, microwaves, grills, rice cookers, juicers, freezers, dishwashers, dishes, hand tools, clothes washers, clothes dryers, water heaters, furnaces, air conditioners, thermostats, televisions, light fixtures, vacuum cleaners, sprinklers, electricity meters, gas meters, photo frames, watches, clocks, fans, speakers, faucets, etc., so long as the devices are equipped with an addressable active and/or passive communications interface for communicating with the IoT network. IoT devices may also include cell phones, desktop computers, laptop computers, tablet computers, personal digital assistants (PDAs), etc. Accordingly, the IoT network may be comprised of a combination of "legacy" Internet-accessible devices (e.g., laptop or desktop computers, cell phones, etc.) in addition to devices that do not typically have Internet-connectivity (e.g., dishwashers, etc.).

FIG. 1A illustrates a high-level system architecture of a wireless communications system 100A in accordance with an aspect of the disclosure. The wireless communications system 100A contains a plurality of IoT devices, which include a television 110, an outdoor air conditioning unit 112, a thermostat 114, a refrigerator 116, and a washer and dryer 118.

Referring to FIG. 1A, IoT devices 110-118 are configured to communicate with an access network (e.g., an access point 125) over a physical communications interface or layer, shown in FIG. 1A as air interface 108 and a direct wired connection 109. The air interface 108 can comply with a wireless Internet protocol (IP), such as IEEE 802.11. Although FIG. 1A illustrates IoT devices 110-118 communicating over the air interface 108 and IoT device 118 communicating over the direct wired connection 109, each IoT device may communicate over a wired or wireless connection, or both.

The Internet 175 includes a number of routing agents and processing agents (not shown in FIG. 1A for the sake of convenience). The Internet 175 is a global system of interconnected computers and computer networks that uses a standard Internet protocol suite (e.g., the Transmission Control Protocol (TCP) and IP) to communicate among disparate devices/networks. TCP/IP provides end-to-end connectivity specifying how data should be formatted, addressed, transmitted, routed and received at the destination.

In FIG. 1A, a computer 120, such as a desktop or personal computer (PC), is shown as connecting to the Internet 175 directly (e.g., over an Ethernet connection or Wi-Fi or 802.11-based network). The computer 120 may have a wired connection to the Internet 175, such as a direct connection to a modem or router, which, in an example, can correspond to the access point 125 itself (e.g., for a Wi-Fi router with both wired and wireless connectivity). Alternatively, rather than being connected to the access point 125 and the Internet 175 over a wired connection, the computer 120 may be connected to the access point 125 over air interface 108 or another wireless interface, and access the Internet 175 over the air interface 108. Although illustrated as a desktop computer, computer 120 may be a laptop computer, a tablet computer, a PDA, a smart phone, or the like. The computer 120 may be an IoT device and/or contain functionality to manage an IoT network/group, such as the network/group of IoT devices 110-118.

The access point 125 may be connected to the Internet 175 via, for example, an optical communication system, such as FiOS, a cable modem, a digital subscriber line (DSL) modem, or the like. The access point 125 may communicate with IoT devices 110-120 and the Internet 175 using the standard Internet protocols (e.g., TCP/IP).

Referring to FIG. 1A, an IoT server 170 is shown as connected to the Internet 175. The IoT server 170 can be implemented as a plurality of structurally separate servers, or alternately may correspond to a single server. In an aspect, the IoT server 170 is optional (as indicated by the dotted line), and the group of IoT devices 110-120 may be a peer-to-peer (P2P) network. In such a case, the IoT devices 110-120 can communicate with each other directly over the air interface 108 and/or the direct wired connection 109. Alternatively, or additionally, some or all of IoT devices 110-120 may be configured with a communication interface independent of air interface 108 and direct wired connection 109. For example, if the air interface 108 corresponds to a Wi-Fi interface, one or more of the IoT devices 110-120 may have Bluetooth or NFC interfaces for communicating directly with each other or other Bluetooth or NFC-enabled devices.

In a peer-to-peer network, service discovery schemes can multicast the presence of nodes, their capabilities, and group membership. The peer-to-peer devices can establish associations and subsequent interactions based on this information.

Figure 1B:
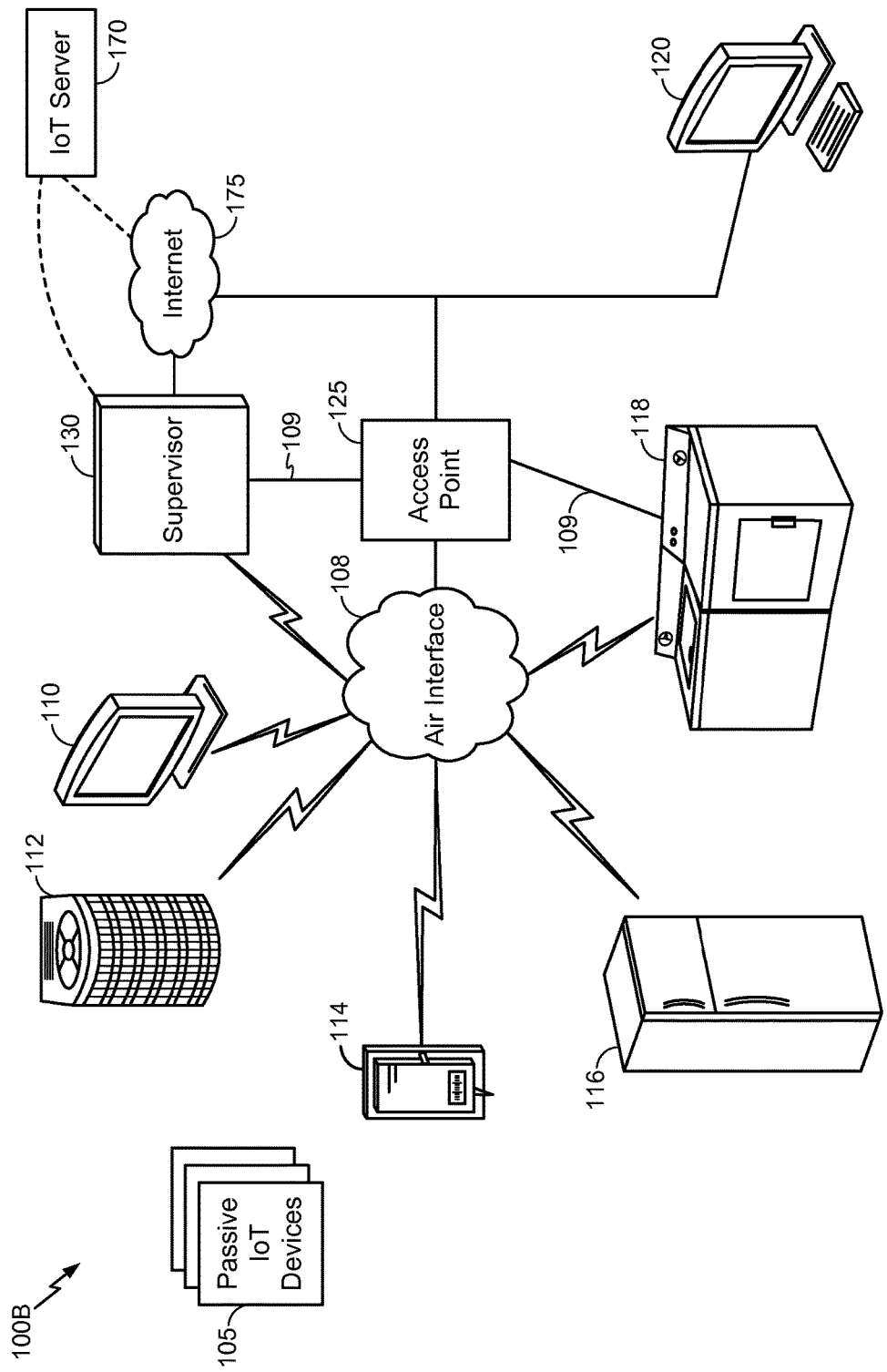
FIG. 1B illustrates a high-level system architecture of a wireless communications system in accordance with another aspect of the disclosure.

In accordance with an aspect of the disclosure, FIG. 1B illustrates a high-level architecture of another wireless communications system 100B that contains a plurality of IoT devices. In general, the wireless communications system 100B shown in FIG. 1B may include various components that are the same and/or substantially similar to the wireless communications system 100A shown in FIG. 1A, which was described in greater detail above (e.g., various IoT devices, including a television 110, outdoor air conditioning unit 112, thermostat 114, refrigerator 116, and washer and dryer 118, that are configured to communicate with an access point 125 over an air interface 108 and/or a direct wired connection 109, a computer 120 that directly connects to the Internet 175 and/or connects to the Internet 175 through access point 125, and an IoT server 170 accessible via the Internet 175, etc.). As such, for brevity and ease of description, various details relating to certain components in the wireless communications system 100B shown in FIG. 1B may be omitted herein to the extent that the same or similar details have already been provided above in relation to the wireless communications system 100A illustrated in FIG. 1A.

Referring to FIG. 1B, the wireless communications system 100B may include a supervisor device 130, which may alternatively be referred to as an IoT manager 130 or IoT manager device 130. As such, where the following description uses the term "supervisor device" 130, those skilled in the art will appreciate that any references to an IoT manager, group owner, or similar terminology may refer to the supervisor device 130 or another physical or logical component that provides the same or substantially similar functionality.

In one embodiment, the supervisor device 130 may generally observe, monitor, control, or otherwise manage the various other components in the wireless communications system 100B. For example, the supervisor device 130 can communicate with an access network (e.g., access point 125) over air interface 108 and/or a direct wired connection 109 to monitor or manage attributes, activities, or other states associated with the various IoT devices 110-120 in the wireless communications system 100B. The supervisor device 130 may have a wired or wireless connection to the Internet 175 and optionally to the IoT server 170 (shown as a dotted line). The supervisor device 130 may obtain information from the Internet 175 and/or the IoT server 170 that can be used to further monitor or manage attributes, activities, or other states associated with the various IoT devices 110-120. The supervisor device 130 may be a standalone device or one of IoT devices 110-120, such as computer 120. The supervisor device 130 may be a physical device or a software application running on a physical device. The supervisor device 130 may include a user interface that can output information relating to the monitored attributes, activities, or other states associated with the IoT devices 110-120 and receive input information to control or otherwise manage the attributes, activities, or other states associated therewith. Accordingly, the supervisor device 130 may generally include various components and support various wired and wireless communication interfaces to observe, monitor, control, or otherwise manage the various components in the wireless communications system 100B.

The wireless communications system 100B shown in FIG. 1B may include one or more passive IoT devices 105 (in contrast to the active IoT devices 110-120) that can be coupled to or otherwise made part of the wireless communications system 100B. In general, the passive IoT devices 105 may include barcoded devices, Bluetooth devices, radio frequency (RF) devices, RFID tagged devices, infrared (IR) devices, NFC tagged devices, or any other suitable device that can provide its identifier and attributes to another device when queried over a short range interface. Active IoT devices may detect, store, communicate, act on, and/or the like, changes in attributes of passive IoT devices.

For example, passive IoT devices 105 may include a coffee cup and a container of orange juice that each have an RFID tag or barcode. A cabinet IoT device and the refrigerator IoT device 116 may each have an appropriate scanner or reader that can read the RFID tag or barcode to detect when the coffee cup and/or the container of orange juice passive IoT devices 105 have been added or removed. In response to the cabinet IoT device detecting the removal of the coffee cup passive IoT device 105 and the refrigerator IoT device 116 detecting the removal of the container of orange juice passive IoT device, the supervisor device 130 may receive one or more signals that relate to the activities detected at the cabinet IoT device and the refrigerator IoT device 116. The supervisor device 130 may then infer that a user is drinking orange juice from the coffee cup and/or likes to drink orange juice from a coffee cup.

Although the foregoing describes the passive IoT devices 105 as having some form of RFID tag or barcode communication interfaces, the passive IoT devices 105 may include one or more devices or other physical objects that do not have such communication capabilities. For example, certain IoT devices may have appropriate scanner or reader mechanisms that can detect shapes, sizes, colors, and/or other observable features associated with the passive IoT devices 105 to identify the passive IoT devices 105. In this manner, any suitable physical object may communicate its identity and attributes and become part of the wireless communication system 100B and be observed, monitored, controlled, or otherwise managed with the supervisor device 130. Further, passive IoT devices 105 may be coupled to or otherwise made part of the wireless communications system 100A in FIG. 1A and observed, monitored, controlled, or otherwise managed in a substantially similar manner.

In accordance with another aspect of the disclosure, FIG. 1C illustrates a high-level architecture of another wireless communications system 100C that contains a plurality of IoT devices. In general, the wireless communications system 100C shown in FIG. 1C may include various components that are the same and/or substantially similar to the wireless communications systems 100A and 100B shown in FIGS. 1A and 1B, respectively, which were described in greater detail above. As such, for brevity and ease of description, various details relating to certain components in the wireless communications system 100C shown in FIG. 1C may be omitted herein to the extent that the same or similar details have already been provided above in relation to the wireless communications systems 100A and 100B illustrated in FIGS. 1A and 1B, respectively.

The communications system 100C shown in FIG. 1C illustrates exemplary peer-to-peer communications between the IoT devices 110-118 and the supervisor device 130. As shown in FIG. 1C, the supervisor device 130 communicates with each of the IoT devices 110-118 over an IoT supervisor interface. Further, IoT devices 110 and 114, IoT devices 112, 114, and 116, and IoT devices 116 and 118, communicate directly with each other.

The IoT devices 110-118 make up an IoT group 160. An IoT device group 160 is a group of locally connected IoT devices, such as the IoT devices connected to a user's home network. Although not shown, multiple IoT device groups may be connected to and/or communicate with each other via an IoT SuperAgent 140 connected to the Internet 175. At a high level, the supervisor device 130 manages intra-group communications, while the IoT SuperAgent 140 can manage inter-group communications. Although shown as separate devices, the supervisor device 130 and the IoT SuperAgent 140 may be, or reside on, the same device (e.g., a standalone device or an IoT device, such as computer 120 in FIG. 1A). Alternatively, the IoT SuperAgent 140 may correspond to or include the functionality of the access point 125. As yet another alternative, the IoT SuperAgent 140 may correspond to or include the functionality of an IoT server, such as IoT server 170. The IoT SuperAgent 140 may encapsulate gateway functionality 145.

Each IoT device 110-118 can treat the supervisor device 130 as a peer and transmit attribute/schema updates to the supervisor device 130. When an IoT device needs to communicate with another IoT device, it can request the pointer to that IoT device from the supervisor device 130 and then communicate with the target IoT device as a peer. The IoT devices 110-118 communicate with each other over a peer-to-peer communication network using a common messaging protocol (CMP). As long as two IoT devices are CMP-enabled and connected over a common communication transport, they can communicate with each other. In the protocol stack, the CMP layer 154 is below the application layer 152 and above the transport layer 156 and the physical layer 158.

Figure 1D:
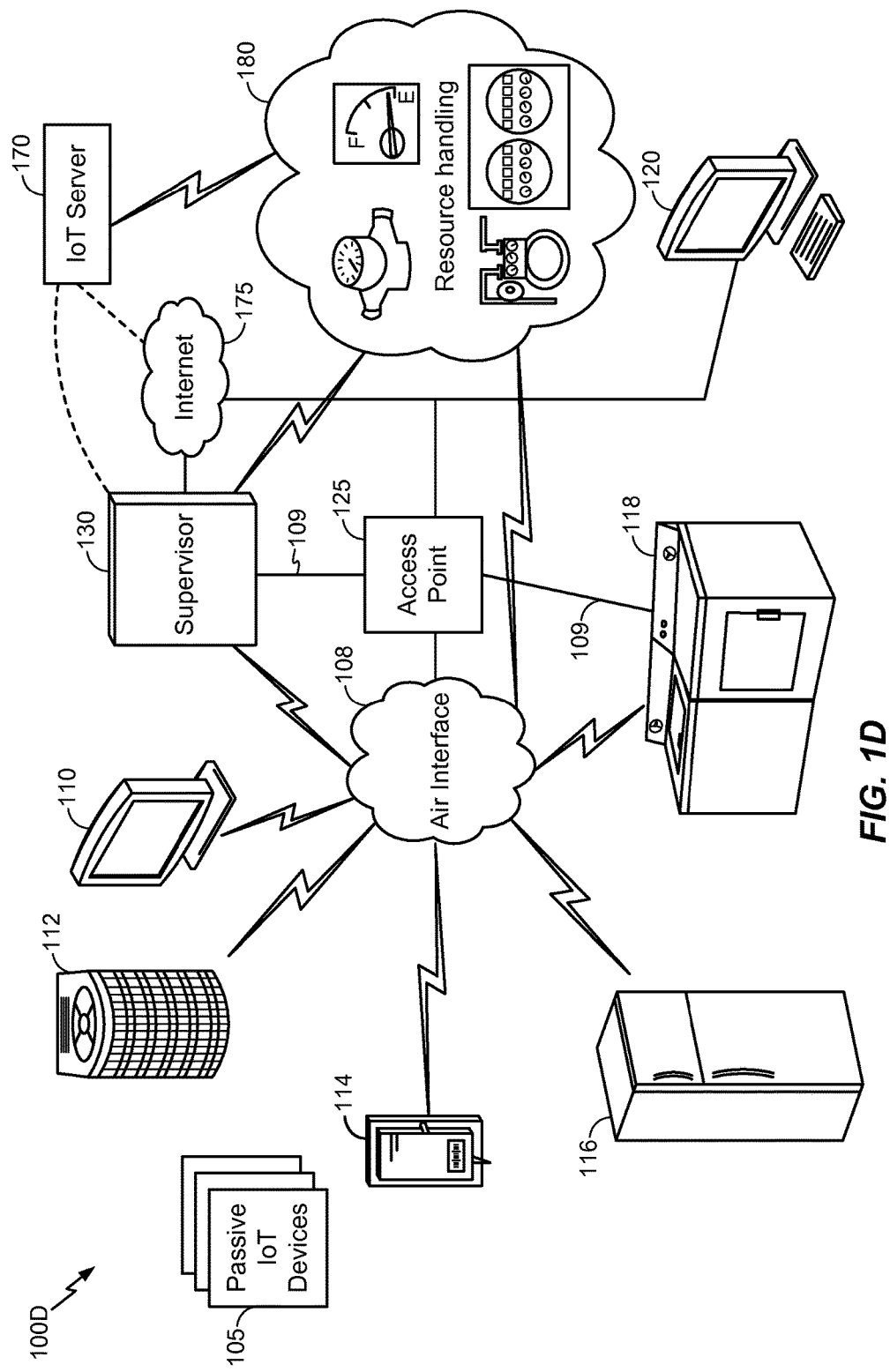
FIG. 1D illustrates a high-level system architecture of a wireless communications system in accordance with an aspect of the disclosure.

In accordance with another aspect of the disclosure, FIG. 1D illustrates a high-level architecture of another wireless communications system 100D that contains a plurality of IoT devices. In general, the wireless communications system 100D shown in FIG. 1D may include various components that are the same and/or substantially similar to the wireless communications systems 100A-C shown in FIGS. 1A-C, respectively, which were described in greater detail above. As such, for brevity and ease of description, various details relating to certain components in the wireless communications system 100D shown in FIG. 1D may be omitted herein to the extent that the same or similar details have already been provided above in relation to the wireless communications systems 100A-C illustrated in FIGS. 1A-C, respectively.

The Internet 175 is a "resource" that can be regulated using the concept of the IoT. However, the Internet 175 is just one example of a resource that is regulated, and any resource could be regulated using the concept of the IoT. Other resources that can be regulated include, but are not limited to, electricity, gas, storage, security, and the like. An IoT device may be connected to the resource and thereby regulate it, or the resource could be regulated over the Internet 175. FIG. 1D illustrates several resources 180, such as natural gas, gasoline, hot water, and electricity, wherein the resources 180 can be regulated in addition to and/or over the Internet 175.

IoT devices can communicate with each other to regulate their use of a resource 180. For example, IoT devices such as a toaster, a computer, and a hairdryer may communicate with each other over a Bluetooth communication interface to regulate their use of electricity (the resource 180). As another example, IoT devices such as a desktop computer, a telephone, and a tablet computer may communicate over a Wi-Fi communication interface to regulate their access to the Internet 175 (the resource 180). As yet another example, IoT devices such as a stove, a clothes dryer, and a water heater may communicate over a Wi-Fi communication interface to regulate their use of gas. Alternatively, or additionally, each IoT device may be connected to an IoT server, such as IoT server 170, which has logic to regulate their use of the resource 180 based on information received from the IoT devices.

Figure 1E:
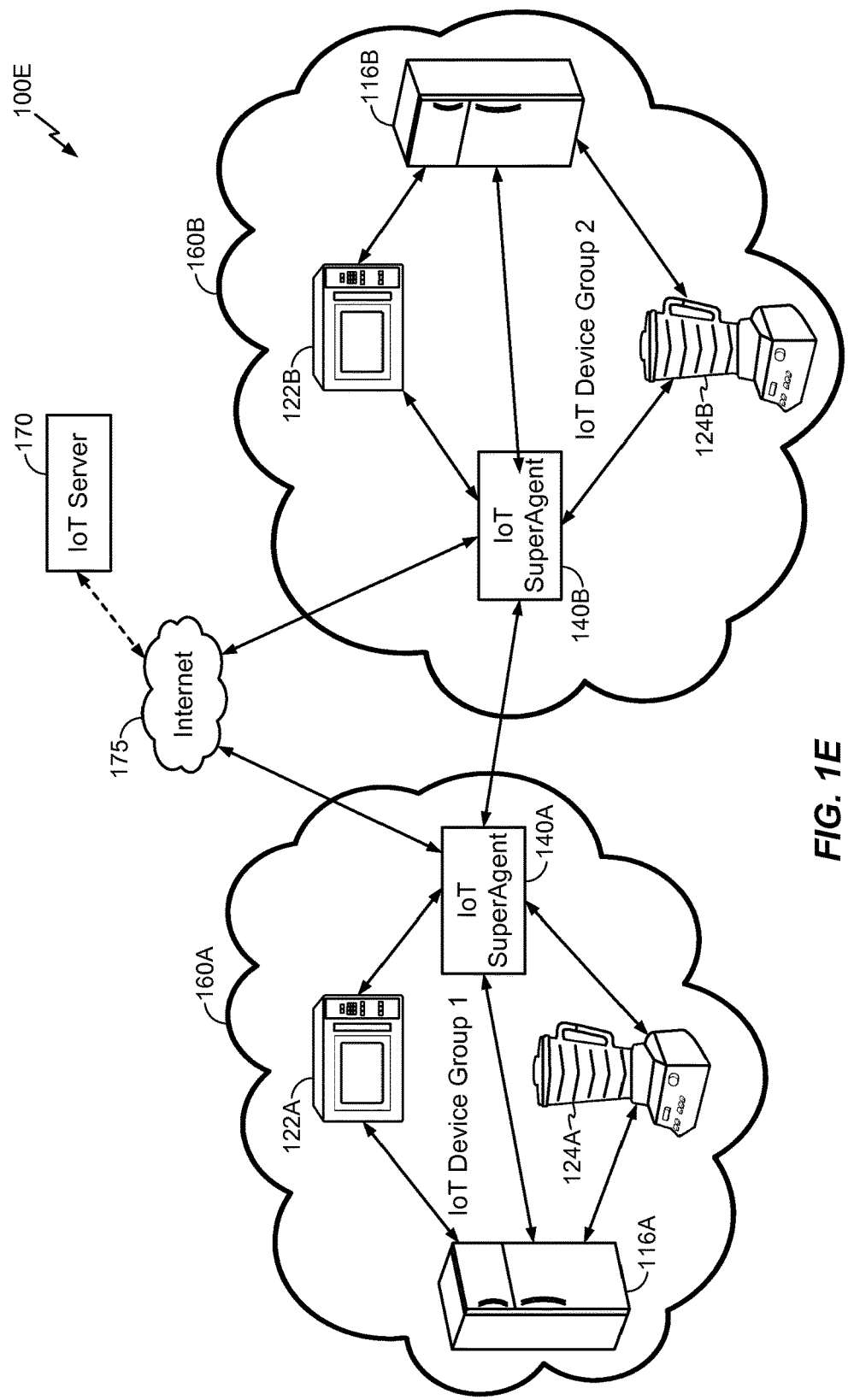
FIG. 1E illustrates a high-level system architecture of a wireless communications system in accordance with an aspect of the disclosure.

In accordance with another aspect of the disclosure, FIG. 1E illustrates a high-level architecture of another wireless communications system 100E that contains a plurality of IoT devices. In general, the wireless communications system 100E shown in FIG. 1E may include various components that are the same and/or substantially similar to the wireless communications systems 100A-D shown in FIGS. 1A-D, respectively, which were described in greater detail above. As such, for brevity and ease of description, various details relating to certain components in the wireless communications system 100E shown in FIG. 1E may be omitted herein to the extent that the same or similar details have already been provided above in relation to the wireless communications systems 100A-D illustrated in FIGS. 1A-D, respectively.

The communications system 100E includes two IoT device groups 160A and 160B. Multiple IoT device groups may be connected to and/or communicate with each other via an IoT SuperAgent connected to the Internet 175. At a high level, an IoT SuperAgent may manage inter-group communications among IoT device groups. For example, in FIG. 1E, the IoT device group 160A includes IoT devices 116A, 122A, and 124A and an IoT SuperAgent 140A, while IoT device group 160B includes IoT devices 116B, 122B, and 124B and an IoT SuperAgent 140B. As such, the IoT SuperAgents 140A and 140B may connect to the Internet 175 and communicate with each other over the Internet 175 and/or communicate with each other directly to facilitate communication between the IoT device groups 160A and 160B. Furthermore, although FIG. 1E illustrates two IoT device groups 160A and 160B communicating with each other via IoT SuperAgents 140A and 140B, those skilled in the art will appreciate that any number of IoT device groups may suitably communicate with each other using IoT Super-Agents.

Figure 2A:
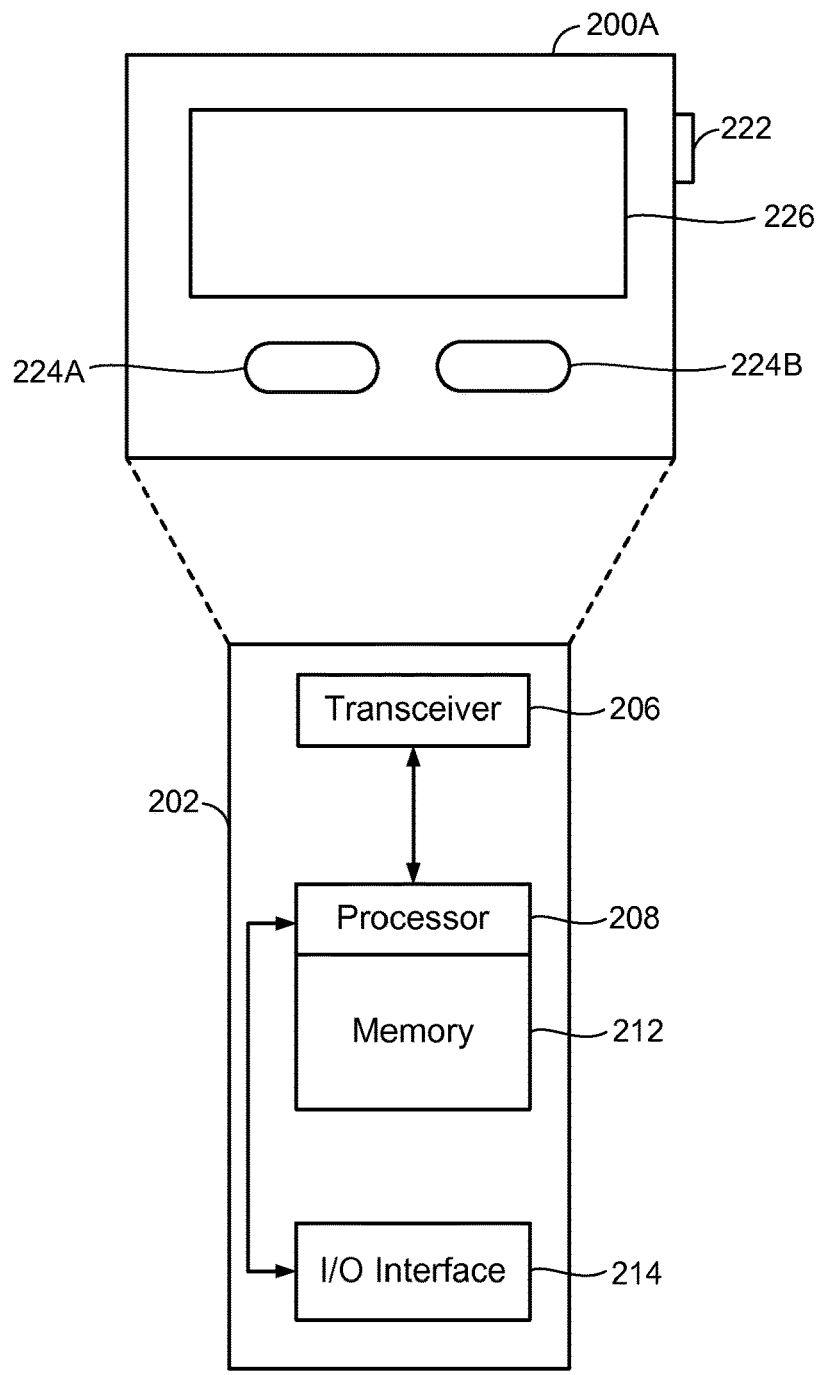

FIG. 2A illustrates a high-level example of an IoT device 200A in accordance with aspects of the disclosure. While external appearances and/or internal components can differ significantly among IoT devices, most IoT devices will have some sort of user interface, which may comprise a display and a means for user input. IoT devices without a user interface can be communicated with remotely over a wired or wireless network, such as air interface 108 in FIGS. 1A-B.

As shown in FIG. 2A, in an example configuration for the IoT device 200A, an external casing of IoT device 200A may be configured with a display 226, a power button 222, and two control buttons 224A and 224B, among other components, as is known in the art. The display 226 may be a touchscreen display, in which case the control buttons 224A and 224B may not be necessary. While not shown explicitly as part of IoT device 200A, the IoT device 200A may include one or more external antennas and/or one or more integrated antennas that are built into the external casing, including but not limited to Wi-Fi antennas, cellular antennas, satellite position system (SPS) antennas (e.g., global positioning system (GPS) antennas), and so on.

While internal components of IoT devices, such as IoT device 200A, can be embodied with different hardware configurations, a basic high-level configuration for internal hardware components is shown as platform 202 in FIG. 2A. The platform 202 can receive and execute software applications, data and/or commands transmitted over a network interface, such as air interface 108 in FIGS. 1A-B and/or a wired interface. The platform 202 can also independently execute locally stored applications. The platform 202 can include one or more transceivers 206 configured for wired and/or wireless communication (e.g., a Wi-Fi transceiver, a Bluetooth transceiver, a cellular transceiver, a satellite transceiver, a GPS or SPS receiver, etc.) operably coupled to one or more processors 208, such as a microcontroller, microprocessor, application specific integrated circuit, digital signal processor (DSP), programmable logic circuit, or other data processing device, which will be generally referred to as processor 208. The processor 208 can execute application programming instructions within a memory 212 of the IoT device. The memory 212 can include one or more of read-only memory (ROM), random-access memory (RAM), electrically erasable programmable ROM (EEPROM), flash cards, or any memory common to computer platforms. One or more input/output (I/O) interfaces 214 can be configured to allow the processor 208 to communicate with and control from various I/O devices such as the display 226, power button 222, control buttons 224A and 224B as illustrated, and any other devices, such as sensors, actuators, relays, valves, switches, and the like associated with the IoT device 200A.

Accordingly, an aspect of the disclosure can include an IoT device (e.g., IoT device 200A) including the ability to perform the functions described herein. As will be appreciated by those skilled in the art, the various logic elements can be embodied in discrete elements, software modules executed on a processor (e.g., processor 208) or any combination of software and hardware to achieve the functionality disclosed herein. For example, transceiver 206, processor 208, memory 212, and I/O interface 214 may all be used cooperatively to load, store and execute the various functions disclosed herein and thus the logic to perform these functions may be distributed over various elements. Alternatively, the functionality could be incorporated into one discrete component. Therefore, the features of the IoT device 200A in FIG. 2A are to be considered merely illustrative and the disclosure is not limited to the illustrated features or arrangement.

Figure 2B:
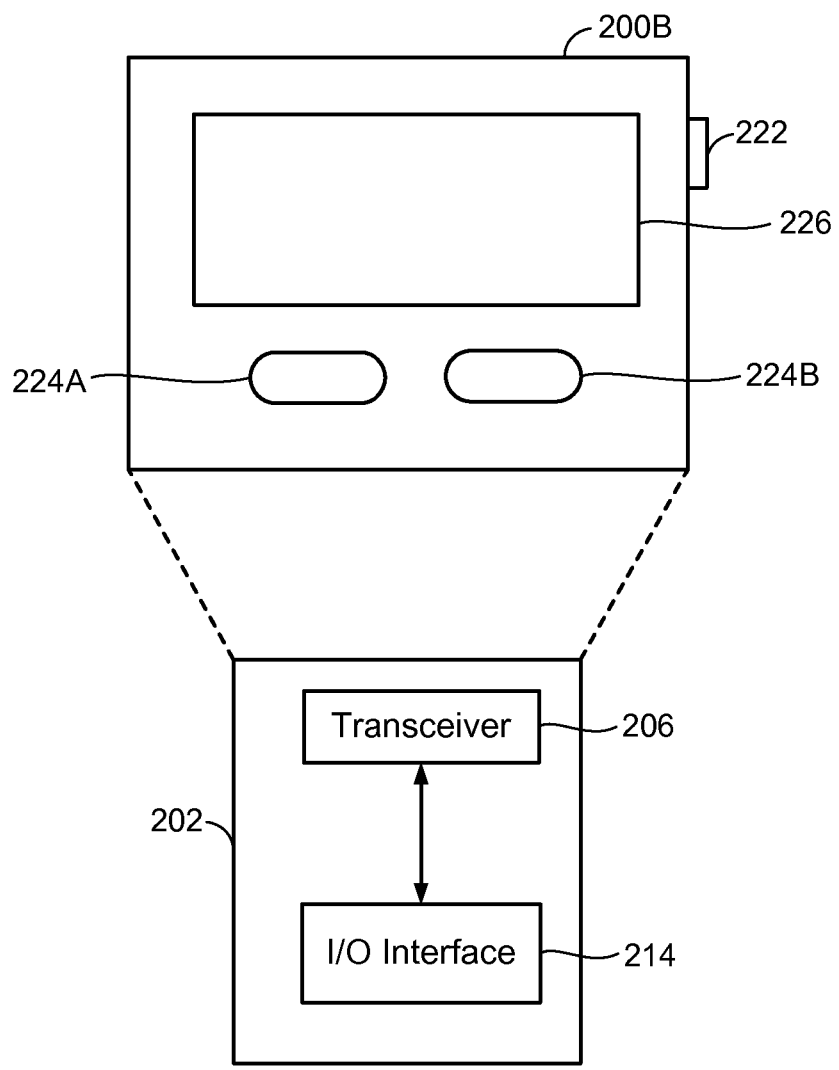
FIG. 2B illustrates an exemplary passive IoT device in accordance with aspects of the disclosure.

FIG. 2B illustrates a high-level example of a passive IoT device 200B in accordance with aspects of the disclosure. In general, the passive IoT device 200B shown in FIG. 2B may include various components that are the same and/or substantially similar to the IoT device 200A shown in FIG. 2A, which was described in greater detail above. As such, for brevity and ease of description, various details relating to certain components in the passive IoT device 200B shown in FIG. 2B may be omitted herein to the extent that the same or similar details have already been provided above in relation to the IoT device 200A illustrated in FIG. 2A.

The passive IoT device 200B shown in FIG. 2B may generally differ from the IoT device 200A shown in FIG. 2A in that the passive IoT device 200B may not have a processor, internal memory, or certain other components. Instead, in one embodiment, the passive IoT device 200B may only include an I/O interface 214 or other suitable mechanism that allows the passive IoT device 200B to be observed, monitored, controlled, managed, or otherwise known within a controlled IoT network. For example, in one embodiment, the I/O interface 214 associated with the passive IoT device 200B may include a barcode, QR code, Bluetooth interface, radio frequency (RF) interface, RFID tag, IR interface, NFC interface, or any other suitable I/O interface that can provide an identifier and attributes associated with the passive IoT device 200B to another device when queried over a short range interface (e.g., an active IoT device, such as IoT device 200A, that can detect, store, communicate, act on, or otherwise process information relating to the attributes associated with the passive IoT device 200B).

Although the foregoing describes the passive IoT device 200B as having some form of RF, barcode, or other I/O interface 214, the passive IoT device 200B may comprise a device or other physical object that does not have such an I/O interface 214. For example, certain IoT devices may have appropriate scanner or reader mechanisms that can detect shapes, sizes, colors, and/or other observable features associated with the passive IoT device 200B to identify the passive IoT device 200B. In this manner, any suitable physical object may communicate its identity and attributes and be observed, monitored, controlled, or otherwise managed within a controlled IoT network.

Figure 3:
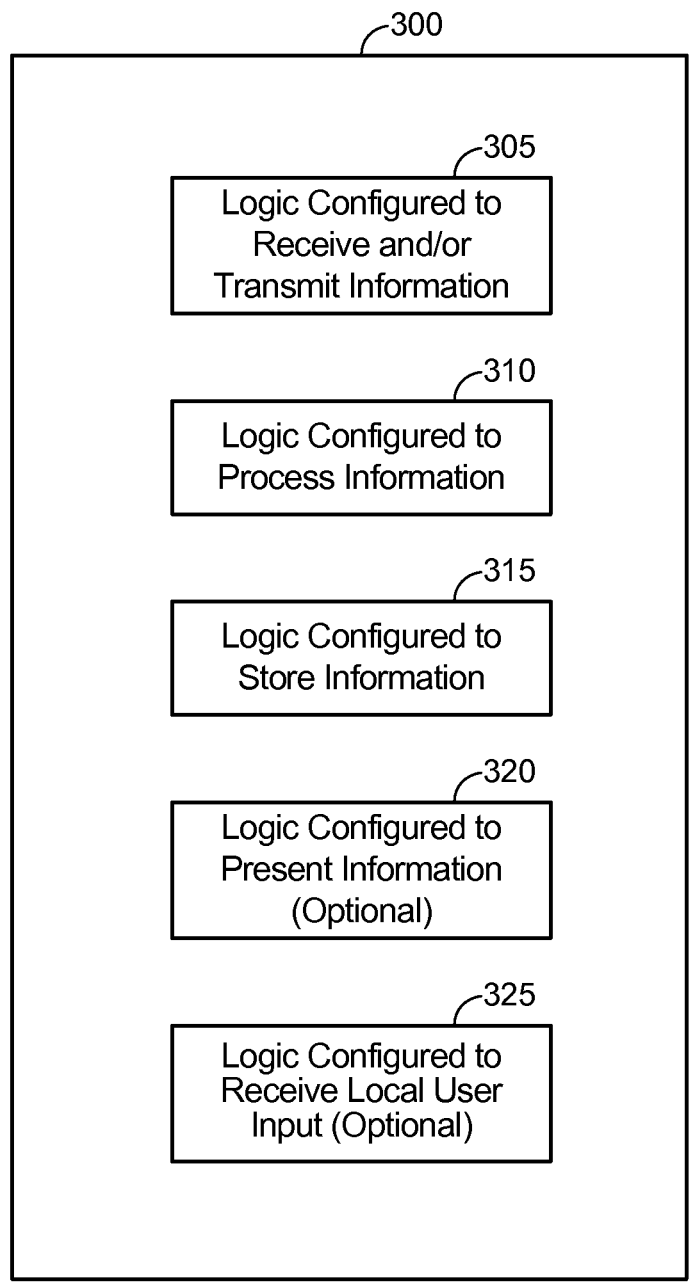
FIG. 3 illustrates a communication device that includes logic configured to perform functionality in accordance with an aspect of the disclosure.

FIG. 3 illustrates a communication device 300 that includes logic configured to perform functionality. The communication device 300 can correspond to any of the above-noted communication devices, including but not limited to IoT devices 110-120, IoT device 200A, any components coupled to the Internet 175 (e.g., the IoT server 170), and so on. Thus, communication device 300 can correspond to any electronic device that is configured to communicate with (or facilitate communication with) one or more other entities over the wireless communications systems 100A-B of FIGS. 1A-B.

Referring to FIG. 3, the communication device 300 includes logic configured to receive and/or transmit information 305. In an example, if the communication device 300 corresponds to a wireless communications device (e.g., IoT device 200A and/or passive IoT device 200B), the logic configured to receive and/or transmit information 305 can include a wireless communications interface (e.g., Bluetooth, Wi-Fi, Wi-Fi Direct, Long-Term Evolution (LTE) Direct, etc.) such as a wireless transceiver and associated hardware (e.g., an RF antenna, a MODEM, a modulator and/or demodulator, etc.). In another example, the logic configured to receive and/or transmit information 305 can correspond to a wired communications interface (e.g., a serial connection, a USB or Firewire connection, an Ethernet connection through which the Internet 175 can be accessed, etc.). Thus, if the communication device 300 corresponds to some type of network-based server (e.g., the application 170), the logic configured to receive and/or transmit information 305 can correspond to an Ethernet card, in an example, that connects the network-based server to other communication entities via an Ethernet protocol. In a further example, the logic configured to receive and/or transmit information 305 can include sensory or measurement hardware by which the communication device 300 can monitor its local environment (e.g., an accelerometer, a temperature sensor, a light sensor, an antenna for monitoring local RF signals, etc.). The logic configured to receive and/or transmit information 305 can also include software that, when executed, permits the associated hardware of the logic configured to receive and/or transmit information 305 to perform its reception and/or transmission function(s). However, the logic configured to receive and/or transmit information 305 does not correspond to software alone, and the logic configured to receive and/or transmit information 305 relies at least in part upon hardware to achieve its functionality.

Referring to FIG. 3, the communication device 300 further includes logic configured to process information 310. In an example, the logic configured to process information 310 can include at least a processor. Example implementations of the type of processing that can be performed by the logic configured to process information 310 includes but is not limited to performing determinations, establishing connections, making selections between different information options, performing evaluations related to data, interacting with sensors coupled to the communication device 300 to perform measurement operations, converting information from one format to another (e.g., between different protocols such as .wmv to .avi, etc.), and so on. For example, the processor included in the logic configured to process information 310 can correspond to a general purpose processor, a DSP, an ASIC, a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration). The logic configured to process information 310 can also include software that, when executed, permits the associated hardware of the logic configured to process information 310 to perform its processing function(s). However, the logic configured to process information 310 does not correspond to software alone, and the logic configured to process information 310 relies at least in part upon hardware to achieve its functionality.

Referring to FIG. 3, the communication device 300 further includes logic configured to store information 315. In an example, the logic configured to store information 315 can include at least a non-transitory memory and associated hardware (e.g., a memory controller, etc.). For example, the non-transitory memory included in the logic configured to store information 315 can correspond to RAM, flash memory, ROM, erasable programmable ROM (EPROM), EEPROM, registers, hard disk, a removable disk, a CD-ROM, or any other form of storage medium known in the art. The logic configured to store information 315 can also include software that, when executed, permits the associated hardware of the logic configured to store information 315 to perform its storage function(s). However, the logic configured to store information 315 does not correspond to software alone, and the logic configured to store information 315 relies at least in part upon hardware to achieve its functionality.

Referring to FIG. 3, the communication device 300 further optionally includes logic configured to present information 320. In an example, the logic configured to present information 320 can include at least an output device and associated hardware. For example, the output device can include a video output device (e.g., a display screen, a port that can carry video information such as USB, HDMI, etc.), an audio output device (e.g., speakers, a port that can carry audio information such as a microphone jack, USB, HDMI, etc.), a vibration device and/or any other device by which information can be formatted for output or actually outputted by a user or operator of the communication device 300. For example, if the communication device 300 corresponds to the IoT device 200A as shown in FIG. 2A and/or the passive IoT device 200B as shown in FIG. 2B, the logic configured to present information 320 can include the display 226. In a further example, the logic configured to present information 320 can be omitted for certain communication devices, such as network communication devices that do not have a local user (e.g., network switches or routers, remote servers, etc.). The logic configured to present information 320 can also include software that, when executed, permits the associated hardware of the logic configured to present information 320 to perform its presentation function(s). However, the logic configured to present information 320 does not correspond to software alone, and the logic configured to present information 320 relies at least in part upon hardware to achieve its functionality.

Referring to FIG. 3, the communication device 300 further optionally includes logic configured to receive local user input 325. In an example, the logic configured to receive local user input 325 can include at least a user input device and associated hardware. For example, the user input device can include buttons, a touchscreen display, a keyboard, a camera, an audio input device (e.g., a microphone or a port that can carry audio information such as a microphone jack, etc.), and/or any other device by which information can be received from a user or operator of the communication device 300. For example, if the communication device 300 corresponds to the IoT device 200A as shown in FIG. 2A and/or the passive IoT device 200B as shown in FIG. 2B, the logic configured to receive local user input 325 can include the buttons 222, 224A, and 224B, the display 226 (if a touchscreen), etc. In a further example, the logic configured to receive local user input 325 can be omitted for certain communication devices, such as network communication devices that do not have a local user (e.g., network switches or routers, remote servers, etc.). The logic configured to receive local user input 325 can also include software that, when executed, permits the associated hardware of the logic configured to receive local user input 325 to perform its input reception function(s). However, the logic configured to receive local user input 325 does not correspond to software alone, and the logic configured to receive local user input 325 relies at least in part upon hardware to achieve its functionality.

Referring to FIG. 3, while the configured logics of 305 through 325 are shown as separate or distinct blocks in FIG. 3, it will be appreciated that the hardware and/or software by which the respective configured logic performs its functionality can overlap in part. For example, any software used to facilitate the functionality of the configured logics of 305 through 325 can be stored in the non-transitory memory associated with the logic configured to store information 315, such that the configured logics of 305 through 325 each performs their functionality (i.e., in this case, software execution) based in part upon the operation of software stored by the logic configured to store information 315. Likewise, hardware that is directly associated with one of the configured logics can be borrowed or used by other configured logics from time to time. For example, the processor of the logic configured to process information 310 can format data into an appropriate format before being transmitted by the logic configured to receive and/or transmit information 305, such that the logic configured to receive and/or transmit information 305 performs its functionality (i.e., in this case, transmission of data) based in part upon the operation of hardware (i.e., the processor) associated with the logic configured to process information 310.

Generally, unless stated otherwise explicitly, the phrase "logic configured to" as used throughout this disclosure is intended to invoke an aspect that is at least partially implemented with hardware, and is not intended to map to software-only implementations that are independent of hardware. Also, it will be appreciated that the configured logic or "logic configured to" in the various blocks are not limited to specific logic gates or elements, but generally refer to the ability to perform the functionality described herein (either via hardware or a combination of hardware and software). Thus, the configured logics or "logic configured to" as illustrated in the various blocks are not necessarily implemented as logic gates or logic elements despite sharing the word "logic." Other interactions or cooperation between the logic in the various blocks will become clear to one of ordinary skill in the art from a review of the aspects described below in more detail.

Figure 4:
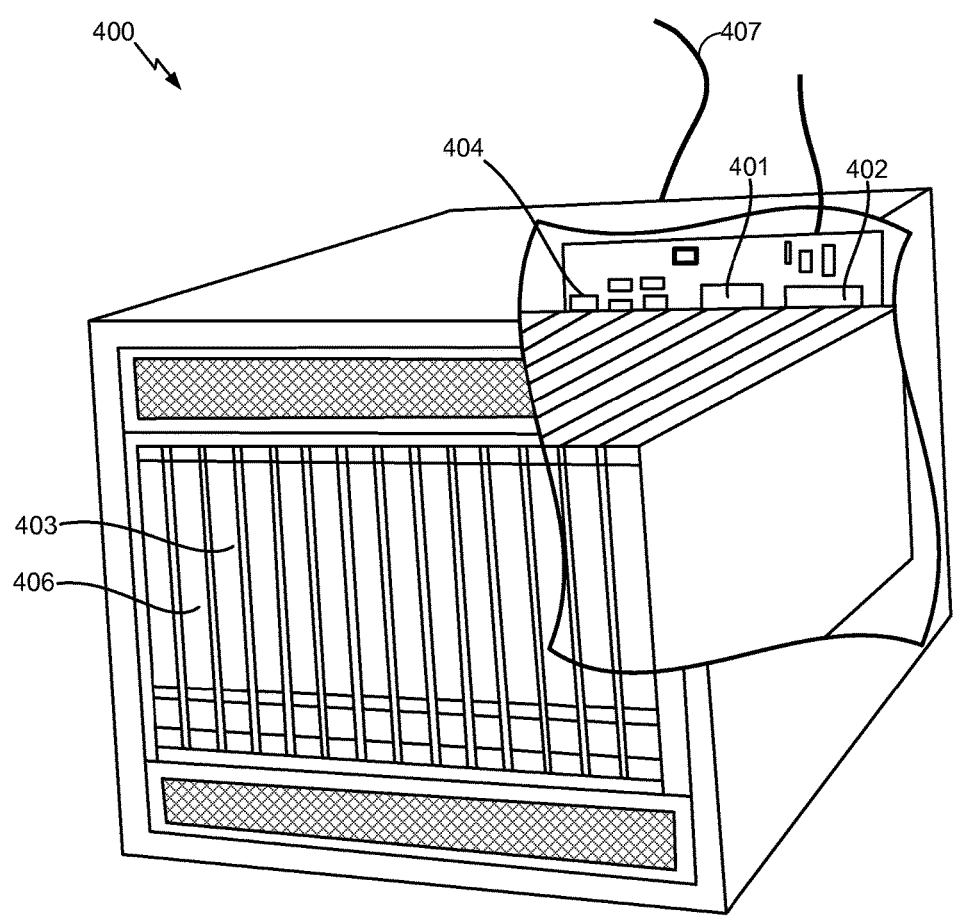
FIG. 4 illustrates an exemplary server according to various aspects of the disclosure.

The various embodiments may be implemented on any of a variety of commercially available server devices, such as server 400 illustrated in FIG. 4. In an example, the server 400 may correspond to one example configuration of the IoT server 170 described above. In FIG. 4, the server 400 includes a processor 401 coupled to volatile memory 402 and a large capacity nonvolatile memory, such as a disk drive 403. The server 400 may also include a floppy disc drive, compact disc (CD) or DVD disc drive 406 coupled to the processor 401. The server 400 may also include network access ports 404 coupled to the processor 401 for establishing data connections with a network 407, such as a local area network coupled to other broadcast system computers and servers or to the Internet. In context with FIG. 3, it will be appreciated that the server 400 of FIG. 4 illustrates one example implementation of the communication device 300, whereby the logic configured to transmit and/or receive information 305 corresponds to the network access points 404 used by the server 400 to communicate with the network 407, the logic configured to process information 310 corresponds to the processor 401, and the logic configuration to store information 315 corresponds to any combination of the volatile memory 402, the disk drive 403 and/or the disc drive 406. The optional logic configured to present information 320 and the optional logic configured to receive local user input 325 are not shown explicitly in FIG. 4 and may or may not be included therein. Thus, FIG. 4 helps to demonstrate that the communication device 300 may be implemented as a server, in addition to an IoT device implementation as in FIG. 2A.

IP based technologies and services have become more mature, driving down the cost and increasing availability of IP. This has allowed Internet connectivity to be added to more and more types of everyday electronic objects. The IoT is based on the idea that everyday electronic objects, not just computers and computer networks, can be readable, recognizable, locatable, addressable, and controllable via the Internet. In general, with the development and increasing prevalence of the IoT, numerous heterogeneous IoT devices that perform different activities and interact with one another in many different ways will surround user in environments that include homes, workplaces, vehicles, shopping centers, and various other locations. As such, the IoT devices and other things that a user may have, interact with, and/or otherwise use can provide substantial information about the user and an associated IoT environment (e.g., user choices, user habits, available resources, usage patterns, device states, etc.). Accordingly, as will be described in further detail below, FIGS. 5A-C illustrate exemplary high-level system architectures in which an IoT-based recommendation engine (or simply "recommendation engine") 510 may provide real-time personalized and context aware recommendations 580 (e.g., products, services, activities, events, etc.) based on various information sources that provide relevant real-time information about a personal IoT environment 500 associated with a user.

Figure 5A:
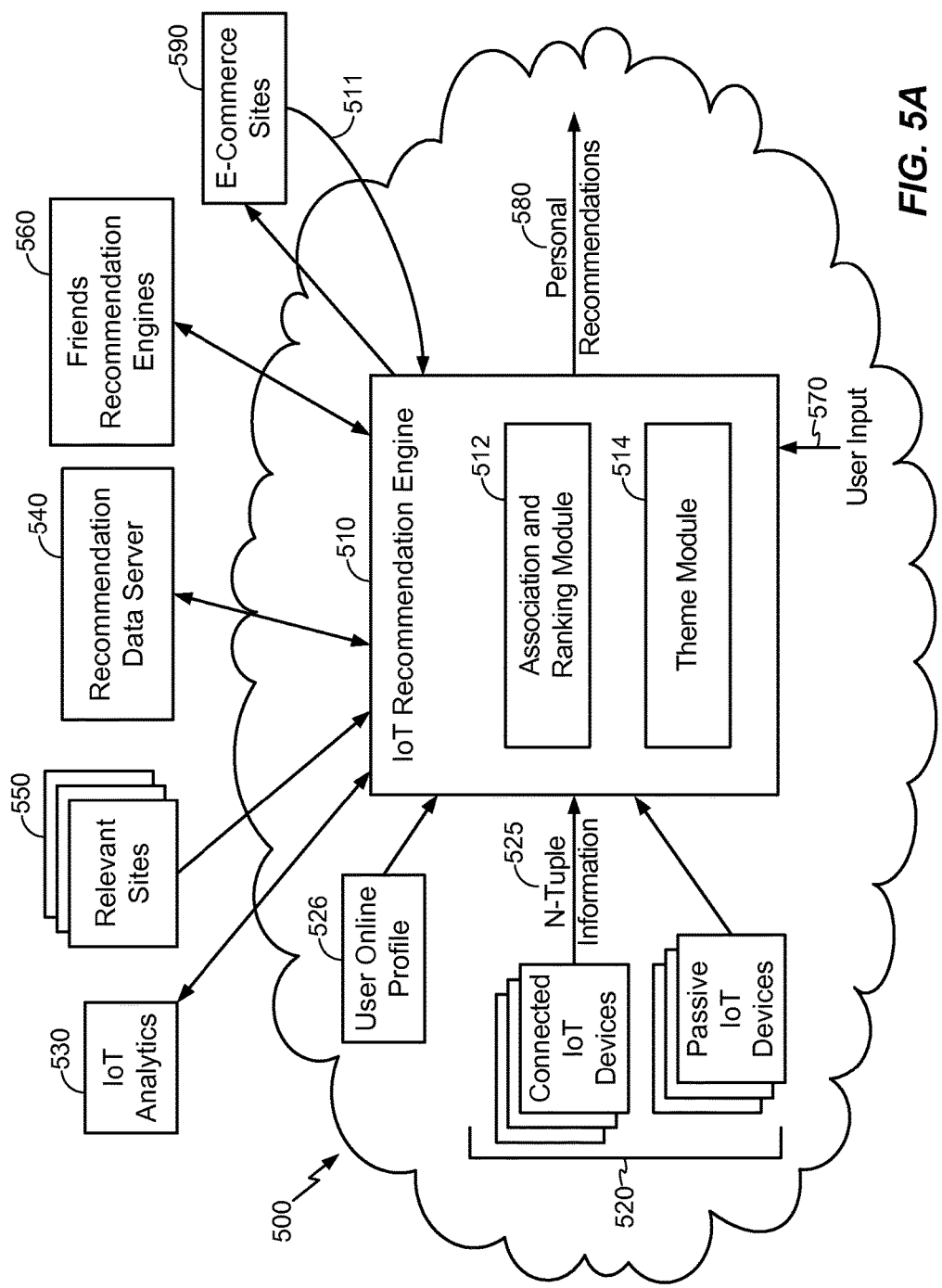
FIGS. 5A-C illustrate exemplary high-level system architectures in which a recommendation engine may provide real-time context aware recommendations based on one or more user IoT environments according to various aspects of the disclosure.
Figure 5B:
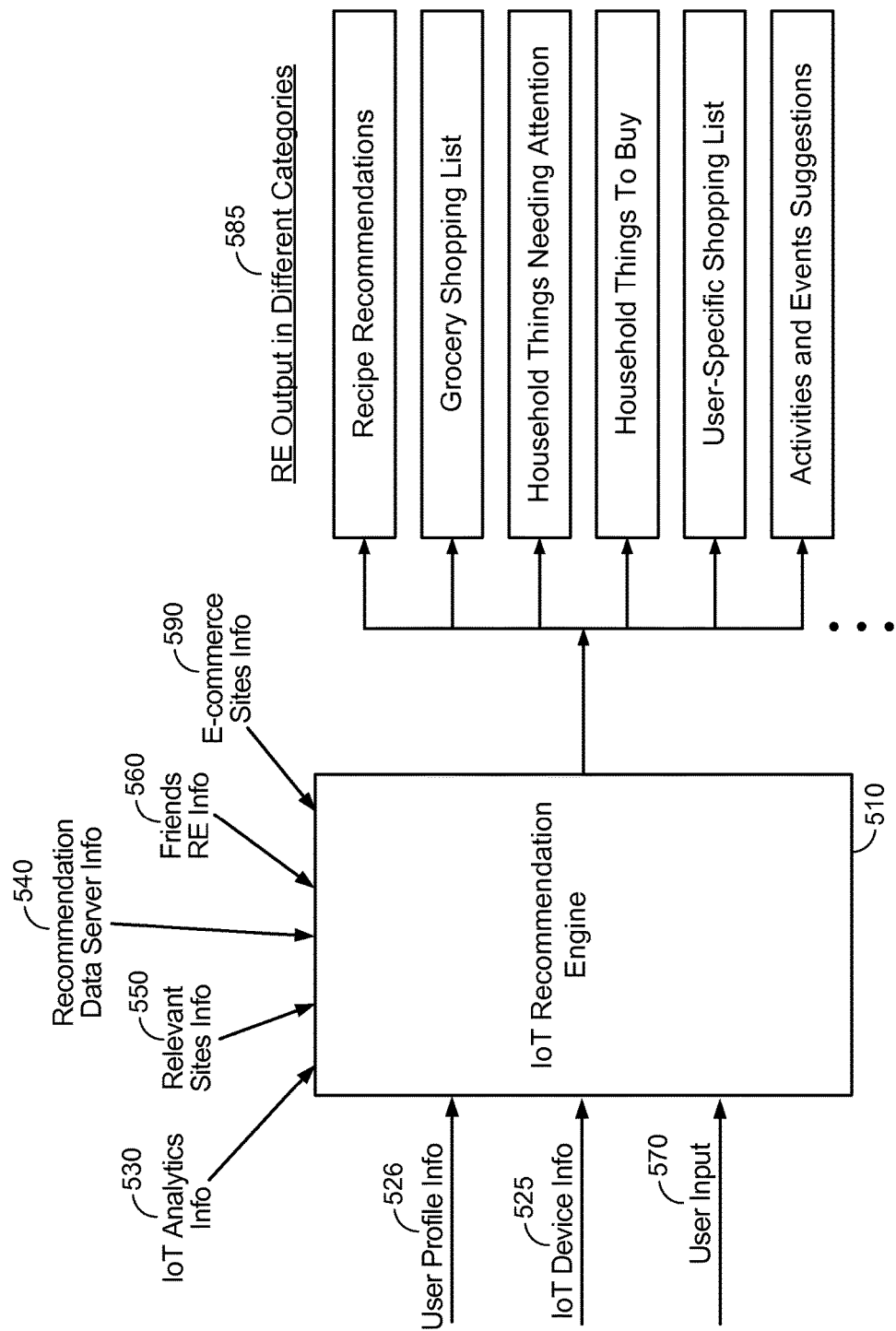
Figure 5C:
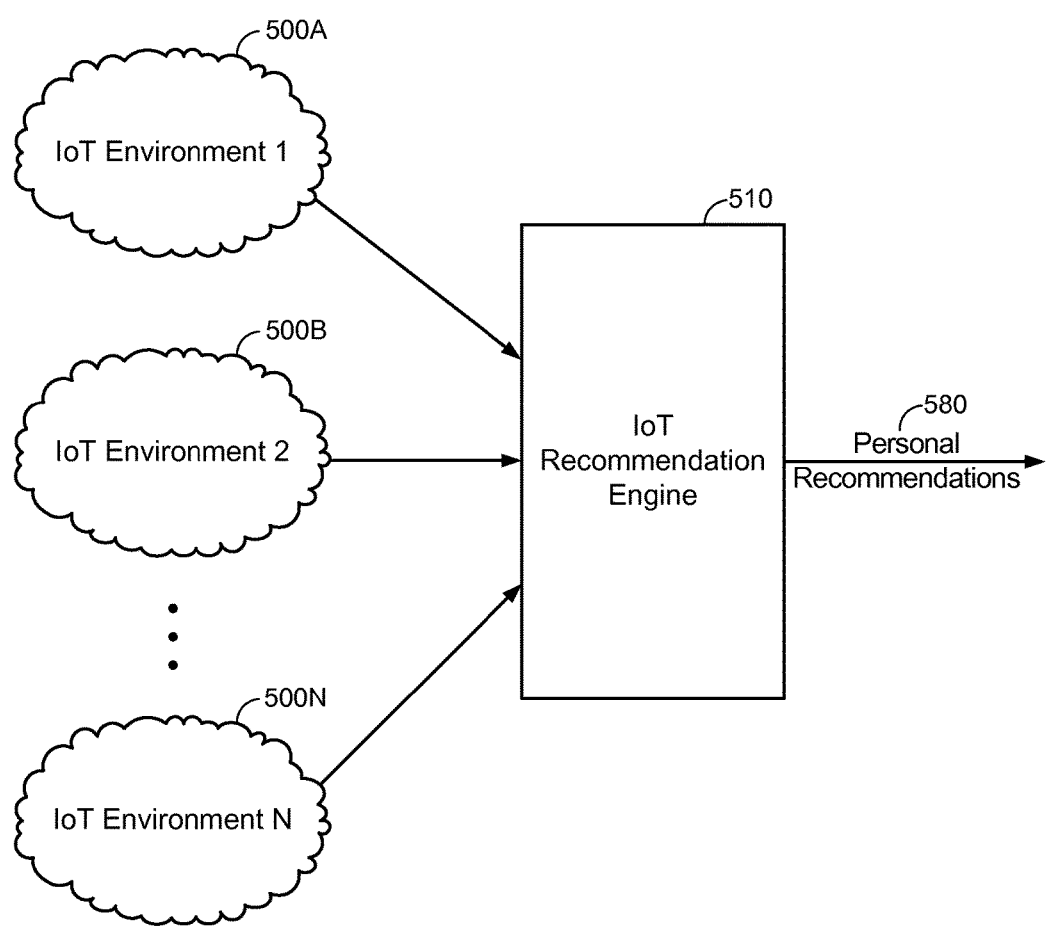

For example, as shown in FIG. 5A, the personal IoT environment 500 may include various connected (or active) IoT devices 520 and various passive IoT devices 520 in addition to an online user profile 526, and the recommendation engine 510 may provide the recommendations 580 based on real-time information obtained from the IoT devices 520 in the IoT environment 500, user-provided input 570, and various other information sources that provide relevant contextual information about the IoT environment 500 and the recommendations 580. Furthermore, in one embodiment, other sources that include information that the recommendation engine 510 can acquire and use when making the recommendations 580 may include a recommendation data server 540 that stores information about various user IoT environments (e.g., IoT environments 500A-N shown in FIG. 5C), friends recommendation engines 560 that provide information about IoT environments associated with friends of the user or other suitable trusted sets of users (not shown), web sites 550 that provide relevant contextual information (Houzz.com or Pinterest.com can provide information relevant to recommendations 580 on house decoration or remodeling projects), IoT analytics data 530 that relevant IoT devices may have generated and uploaded, and e-commerce web sites 590 to search for and fetch information associated with products and/or services relevant to the recommendations 580.

Furthermore, in accordance with various aspects, the IoT environment 500 shown in FIG. 5 may be implemented in the wireless communications systems 100A-E shown in FIGS. 1A-E and may therefore include various components that are the same and/or substantially similar to the wireless communications systems 100A-E shown therein and/or the exemplary IoT device 200A shown in FIG. 2A, the exemplary passive IoT device 200B shown in FIG. 2B, the exemplary 300 communication device shown in FIG. 3, and/or the exemplary server 400 shown in FIG. 4. As such, for brevity and ease of description, various details relating to certain components in the IoT environment 500 shown in FIG. 5 may be omitted herein to the extent that the same or similar details have already been provided above in relation to FIGS. 1-4, which were described in greater detail above.

According to one aspect, the recommendation engine 510 may generally monitor, aggregate, filter, and otherwise process relevant real-time information associated with the IoT devices 520 in the user IoT environment 500 to provide personal and context-aware recommendations 580. For example, the recommendation engine 510 may generate the recommendations 580 based on ranked associations between the user and the various items in the IoT environment 500, wherein the ranked associations may be determined using an association and ranking module 512 based on IoT device profiles, device states, device usage patterns, proximity information (e.g., user proximity with the IoT devices 520, proximity between the IoT devices 520, etc.), and other contextually relevant information about the IoT environment 500, as will be described in further detail herein. Furthermore, the recommendations 580 may be uploaded to a recommendation data server 540, shared with or otherwise made available to friends or other suitable trusted sets of users, or otherwise used to provide similar recommendations 580 to other users. In a similar respect, the recommendations 580 may be based on information stored on the recommendation data server 540 and similar recommendations that other recommendation engines 560 have provided to friends and/or other trusted sets of users.

More particularly, in one exemplary embodiment, the personal context aware recommendation engine 510 can be developed utilizing real-time information from the user IoT environment 500, wherein the real-time information may include device profiles, device states, user profiles (e.g., collected from IoT devices 520 such as mobile phones and tablet computers in addition to online sites where users have accounts such as Facebook, Twitter, Amazon, etc.), and device usage patterns, and other relevant information that the recommendation engine 510 may fetch or otherwise obtain from one or more IoT devices 520 in the IoT environment 500 around the user. For example, in one embodiment, the IoT devices 520 can include, without limitation, home appliances, HVAC systems, home lighting systems, multimedia systems, home security systems, motor vehicles. As such, in one exemplary use case, the IoT devices 520 can include one or more user devices that store perishable or other consumable goods (e.g., a refrigerator, wine cooler, pantry, etc.). In this exemplary use case, the device profiles can therefore include details about the devices 520 (e.g., an LG® stainless steel refrigerator with a French door), the device states can include operative conditions associated with the devices 520 and/or inventories and ages associated with the goods or foodstuffs stored therein, and the user profiles and usage patterns can be derived from user interactions with the IoT devices 520 in combination with other information sources (e.g., user purchasing histories, demographic data, user input 570, resource availability, user likes, choices, and habits determined through data collected from the IoT devices 520, relevant sites 550, relevant e-commerce sites 590, the user IoT environment 500 at different locations, etc.).

According to another exemplary aspect, as noted above, the recommendation engine 510 can include an association and ranking module 512 configured to automatically form associations between IoT devices 520 and users based on the device profiles, device states, user profiles, device usage patterns, proximity information (e.g., user proximity with IoT devices 520 or proximity between IoT devices 520), time of day, device and/or user locations, or other suitable information having contextual relevance to the IoT environment 500. For example, in one embodiment, the association and ranking module 512 may define an association as being common or shared for one or more IoT devices 520 that are common or otherwise shared among multiple users determined from device profiles, locations, device usage patterns, or other relevant information (e.g., kitchen appliances and faucets may have a common or shared association due to being used by all household members). In another example, the association and ranking module 512 may define an association for an IoT device 520 as specific to a particular user (e.g., a car having a primary driver may be associated with that particular user). Furthermore, the association and ranking module 512 may define the associations between IoT devices 520 and users based on proximity and/or location information that defines relationships between certain IoT devices 520 and specific users (e.g., clothes or shoes that only one particular person wears may be associated with that user, a lamp located in a child's room may be associated with that child, etc.) and/or multiple users (e.g., furniture located in a master bedroom may be shared among spouses, partners, roommates, etc.). Furthermore, the association and ranking module 512 may dynamically update the associations between IoT devices 520 and users to reflect real-time changes in the IoT environment 500 (e.g., if two children share a bedroom, lamps in the shared bedroom may be associated with both children, and when the children subsequently have individual bedrooms, the lamp associations may be dynamically updated to only be associated with the particular child assigned to the bedroom where the individual lamps are located).

In one embodiment, the association and ranking module 512 may further assign rankings to differentiate multiple IoT devices 520 that have the same or substantially similar user associations, wherein the recommendation engine 510 may then use the rankings to provide the recommendations 580 to the user. For example, different IoT devices 520 having a similar type can be ranked (e.g., different shows may be ranked differently based on usage), different modes in which multi-use IoT devices 520 can be used or otherwise operated can be ranked (e.g., in a combination microwave-oven device, the microwave usage mode may be ranked higher than the oven usage mode based on usage frequency), and IoT devices 520 having different types or classifications can be ranked (e.g., certain prescription refills may have higher rankings than red wine that needs to be re-stocked). In one embodiment, the association and ranking module 512 may determine the rankings from device usage patterns and respective functionalities that the devices 520 provide (e.g., a refrigerator may be ranked higher than a grill). Furthermore, certain rankings may be common to all users (e.g., rankings for refrigerators or other devices that have common or shared associations), specific to certain users (e.g., a mother prefers casual shoes from Nordstrom and may therefore have high-end shoes ranked higher than other casual shoes), and/or differ from one user context to another based on usage patterns, proximities, or other relevant factors (e.g., a surround system may have a higher ranking when associated with a father that uses the surround system frequently and a lower ranking when associated with a mother that uses the surround system infrequently).

According to another exemplary aspect, the recommendation engine 510 may include a theme module 514 configured to characterize or otherwise classify a personal space in the user IoT environment 500 (e.g., a home, car, office, etc.) based on information collected and processed from certain IoT devices 520 present in that personal space. For example, in one embodiment, a personal space in the IoT environment 500 may comprise a kitchen, and the recommendation engine 510 may assign a "stainless steel" theme or classification to the kitchen based on the kitchen including all stainless steel appliances or more stainless steel appliances than any other type. As such, the theme or classification assigned to the personal space can be used to make contextually relevant recommendations 580 to a user interested in buying other appliances, kitchen furniture, or other kitchen items (e.g., recommending a stainless steel faucet to match the installed appliances). Similarly, the recommendation engine 510 can assign a "contemporary" or "traditional" theme or classification to a house in the IoT environment 500 or an area within the house (e.g., a family room) based on furniture and décor in the house. According to another aspect, the recommendation engine 510 may learn more detailed characteristics associated with the personal spaces from suitable information sources (e.g., the recommendation engine 510 may obtain a house layout or floorplan from public housing records based on the home address, paint colors used in the house from inputs 570 that the user may provide, etc.). Accordingly, the detailed characteristics associated with the personal space can be considered when providing the relevant recommendations 580. Furthermore, in one embodiment, the themes or classifications assigned to personal spaces in the IoT environment 500 may be considered to recommend relevant products or services. For example, in one embodiment, the recommendations 580 may be determined based on friends or other users with the "contemporary" house theme buying certain sectional sofas or other users with a gray leather sectional sofa buying certain console tables. In another example, based on user inputs 570 that specify the paint colors used in the house, the recommendations 580 may identify artwork, furniture, bedding, lamp, or other décor that matches or complements the paint colors used in the house (or certain rooms in the house) in addition to other décor items.

According to another exemplary aspect, the recommendation engine 510 may automatically build and enhance the user profiles based on usage patterns associated with the IoT devices 520 that the recommendation engine 510 learns over time in combination with other suitable input (e.g., user purchase histories, a user online profile 526, user demographics, user activities, user inputs 570, etc.). For example, the recommendation engine 510 may build a particular user's profile 526 as a health-conscious male profile based on the groceries that the user typically buys, appliances that the user typically interacts with (e.g., a juicer versus a coffee-maker), exercise habits (e.g., collected from a Fitbit IoT device 520), or other real-time knowledge relating to user context, wherein the health-conscious male profile may be taken into account to provide appropriately relevant food item or other recommendations 580. In another example, user profile information from multiple family members can be considered when recommending items to any family member (e.g., if both parents in a household like Starbucks, which may be determined from GPS information on a mobile phone IoT device 525 showing frequent visits to Starbucks, the recommendation engine 510 may provide a recommendation 580 to purchase a Starbucks coffee-maker).

According to another exemplary aspect, referring to FIG. 5B, the recommendation engine 510 may proactively provide the recommendations 580 to users in various different categories 585 based on information obtained from the IoT environment 500. For example, in one embodiment, the various categories 585 may include recipe recommendations, grocery shopping lists, household things that need attention, household things to buy, user-specific shopping lists, activity and event suggestions, or any other suitable category. Accordingly, the recommendation engine 510 may proactively recommend certain actions, events, products, services, or other items that may be relevant or helpful to users according to various criteria and objectives and based on real-time knowledge about the IoT devices 520 in the environment 500 surrounding the users and the profiles associated with the users. For example, one objective may be to efficiently expend available resources in the user IoT environment 500 (e.g., recommending recipes that use groceries nearing expiration dates, recommending a combined shopping trip to buy batteries and groceries from stores in proximity to one another in order to save time, etc.). Another exemplary use case may include providing a recipe recommendation 580 on a screen associated with an IoT television device 520 based on groceries that are present in a refrigerator and pantry, wherein the recipe recommendation 580 may incorporate temporal criteria (e.g., to provide breakfast, lunch, dinner, or other recipes relevant to the time-of-day) or user profile criteria (e.g., making gluten-free, dairy-free, or other recipe recommendations 580 tailored to special dietary restrictions associated with the user). In another exemplary use case, a weekend activity recommendation 580 may be provided based on certain tickets, coupons, gift certificates, or other items a user may have at home, in a purse, in a wallet, or otherwise (e.g., recommending that the user visit the San Diego Zoo on a day with nice weather if the user has a zoo pass). Of course, many other use cases will be apparent to those skilled in the art (e.g., the recommendations 580 may be based on states associated with the IoT devices 520, such as a microwave needing to be fixed, a bulb needing replacement, and so on, a recommendation 580 may suggest a trip to SeaWorld if the user has not visited there recently and expresses interest in a toddler-friendly weekend activity, etc.).

According to another exemplary aspect, as noted above, the real-time information that the recommendation engine 510 utilizes to make the recommendations 580 based on the user IoT environment 500 may generally comprise n-tuple information 525 that the recommendation engine 510 can receive, fetch, aggregate, filter, or otherwise obtain from IoT devices 520 surrounding the user within the IoT environment 500. More particularly, in one embodiment, the n-tuple information 525 may include, among other things, profiles, states, contexts, usage patterns, user associations, location or personal space associations, temporal associations, rankings, or other relevant information associated with the IoT devices 520 in the user IoT environment 500, which may include passive IoT devices 520 that do not have communication capabilities and/or devices 520 that are otherwise not connected to a network in the IoT environment 500. As such, information for such passive IoT devices 520 may be collected through non-connected mechanisms (e.g., via a QR code, RFID tag, via user input 570, etc.). Furthermore, in one embodiment, the n-tuple information 525 may further include user profiles (e.g., user-specific profiles, multi-user profiles obtained from IoT devices 520 such as mobile phones, the user online profile 526, etc.), which may be utilized to make the recommendations 580. The recommendation engine 510 may further utilize any analytics data 530 that the relevant IoT devices may have generated and uploaded (e.g., to an analytics server) and/or any relevant user inputs 570. Furthermore, in one embodiment, the recommendation engine 510 can upload the n-tuple information 525 or other relevant real-time information about the IoT environment 500 to a recommendation data server 540, which may provide a larger, community-based knowledge source that can be used to make the recommendations 580 to the user and/or other users. In one embodiment, the recommendation engine 510 may enable the user to approve or disapprove uploading the information to the recommendation data server 540 and/or enable the user to control the access that other users will have to any information that the user approves uploading to the recommendation data server 540. For example, the user may only allow a trusted set of users to have access to the information uploaded to the recommendation data server 540 (e.g., Facebook friends or users in another suitable friends list), only allow other users to access certain information uploaded to the recommendation data server 540 (e.g., restricting access to potentially sensitive information), make certain information uploaded to the recommendation data server 540 publicly accessible, or any suitable combination thereof. Furthermore, in one embodiment, the user may make the recommendations 580 and/or the information used to make the recommendations 580 available to friends or other sets of users even if the user chooses to not upload the recommendations 580 and/or the information used to make the recommendations to the recommendation data server 540.

Accordingly, the recommendation engine 510 can generally identify and provide the user with relevant, personalized, context aware recommendations 580 based on real-time information from various knowledge sources associated with the IoT environment 500, which may include the n-tuple information 525 obtained from the IoT devices 520 in the IoT environment 500, including the connected and/or passive IoT devices 520, the user online profile 526, the analytics data 530 that the other relevant IoT devices generate, information obtained from the recommendation data server 540, information obtained from other sites 550 having relevance to certain contexts (e.g., Houzz.com may be considered relevant to recommendations 580 that relate to remodeling or house decoration projects), user preferences (e.g., a Pinterest online user profile may be generally relevant to making recommendations 580 based on things that a user likes or in which the user has expressed interest), association and ranking information relevant to the IoT environment 500 (e.g., the ranked associations between users and IoT devices 520), user personal space themes or classifications relevant to the IoT environment 500, friend recommendation engine information 560, and any relevant user inputs 570 that provide details about the environment 500 surrounding the user that cannot be readily or automatically learned directly from the user IoT environment 500 (e.g., paint colors used in a house), among other things. As such, the recommendation engine 510 may employ or otherwise implement the various aspects described above to provide context aware recommendations 580 on everyday things (e.g., recipes, weekend activities, house activities, etc.), specific things that the user may be looking to buy, or any other suitable aspect that may have relevance to the user based on various real-time information sources.

According to another exemplary aspect, the recommendation engine 510 may generate search criteria to look for relevant items on appropriate external e-commerce websites 590 (e.g. Amazon.com or Overstock.com) based on information acquired from various knowledge sources associated with the IoT environment 500. For example, as noted above, the various knowledge sources may include, among other things, information collected from IoT devices 520, device associations and rankings (e.g., derived using the association and ranking module 512), user profile data that the recommendation engine 510 derives from an user online profile 526 and other relevant information, the recommendation data server 540, friends recommendation engines 560, other sites 550 having contextual relevance, and IoT analytics 530. In one embodiment, the recommendation engine may 510 further filter and/or prioritize search results 511 obtained from e-commerce websites 590 before making recommendations 580 to the user based on the search results 511 to further ensure that the recommendations 580 match and are in compliance with knowledge obtained and derived from information collected from the user's IoT environment 500.

According to another exemplary aspect, as shown in FIG. 5C, the recommendation engine 510 may provide personal recommendations 580 based on multiple proximal IoT environments 500A-N that may be associated with a particular user. For example, in one embodiment, the user may have two homes, including a primary residence and a vacation home, which may form two separate IoT environments (e.g., IoT environments 500A and 500B). In a similar respect, the user may have an office that forms another IoT environment 500N in addition to the IoT environment 500A corresponding to the primary residence and/or the IoT environment 500B corresponding to the vacation home. As such, the recommendation engine 510 may collect information from multiple IoT environments 500A-N relevant to the user and provide recommendations 580 based on information collected therefrom. For example, in one embodiment, the online user profile 526 may be built based on choices and selections that the user has made across the multiple IoT environments 500A-N, and the recommendation engine 510 may alternatively (or additionally) provide recommendations 580 specific to each respective IoT environment 500A-500N (e.g., providing recommendations 580 for décor items specific to a theme assigned to one of the IoT environments 500A-N).

Figure 6:
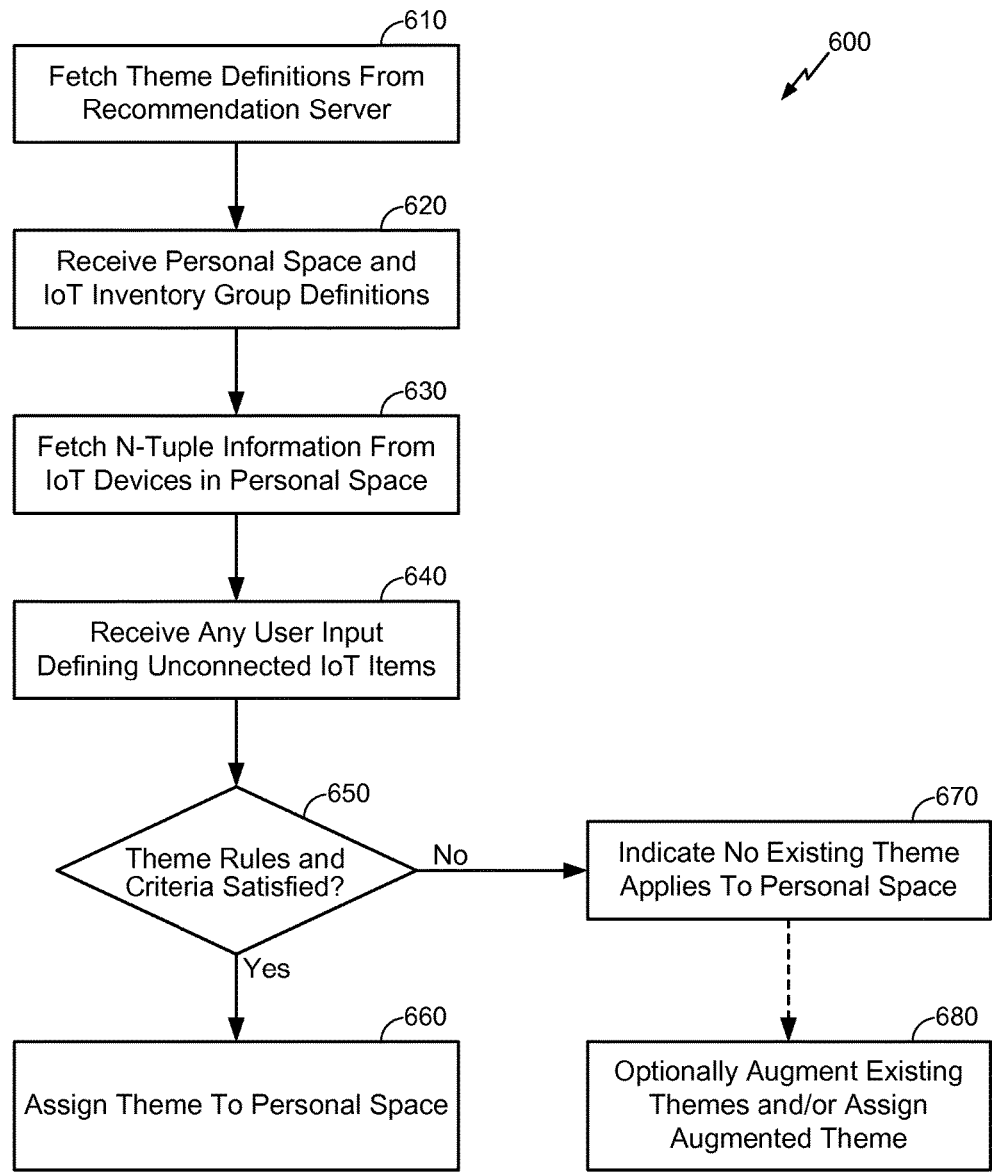
FIG. 6 illustrates an exemplary method that a recommendation engine may perform to assign a theme to a personal space in a user IoT environment according to various aspects of the disclosure.

According to various aspects, FIG. 6 illustrates an exemplary method 600 that a recommendation engine (e.g., the recommendation engine 510 shown in FIG. 5 and described in further detail above) may perform to assign a theme to a personal space in a user IoT environment (e.g., the environment 500 shown in FIG. 5 and described in further detail above). More particularly, in one embodiment, the recommendation engine may include, among other things, a theme module configured to perform the method 500 in order to characterize or otherwise classify a personal space in the user IoT environment (e.g., a home, car, office, etc.) based on certain IoT devices present in that personal space.

For example, in one embodiment, various themes or other suitable classifications that may be assigned to a particular personal space may be predefined and stored on a recommendation data server, wherein each theme or other personal space classification may have one or more predefined rules or other criteria that can be applied to determine whether a particular personal space has characteristics that match any themes or classifications stored on the recommendation data server. Furthermore, in one embodiment, the predefined rules or other criteria may indicate general characteristics associated with certain personal spaces (e.g., characteristics associated with a house, a kitchen, a bedroom, a vehicle, an office, etc.) and the rules or other criteria may further indicate specific characteristics associated with certain personal spaces (e.g., characteristics associated with a contemporary house, a stainless steel kitchen, a modern bedroom, a sports utility vehicle, a home office, etc.). Accordingly, in one embodiment, the recommendation engine may fetch the various theme or other classification definitions from the recommendation data server at block 610 and subsequently apply the rules and criteria associated therewith to assign one or more themes or classifications to one or more personal spaces in the IoT environment.

In particular, the recommendation engine may generally assign the themes or classifications in response to receiving user inputs to define one or more personal spaces in the IoT environment and/or one or more groups to define IoT inventories within the defined personal spaces at block 620. For example, in one embodiment, the user inputs received at block 620 to define the personal spaces may indicate that the IoT environment includes a house in addition to a kitchen, family room, master bedroom, or other suitable areas within the house. Furthermore, in one embodiment, the user inputs received at block 620 may indicate one or more separate groups that define IoT inventories within the various personal spaces that are defined at block 620, which may be especially useful if the user IoT environment includes multiple personal spaces that may have separate and/or overlapping IoT inventories. For example, in one embodiment, the groups defined at block 620 may include all appliances located in the kitchen within a "kitchen appliances" group, all appliances located in the house within a "household appliances" group (e.g., everything in the "kitchen appliances" group in addition to a washer and dryer located in a laundry room, an extra refrigerator that the user may keep in a garage, etc.), and so on.

In one embodiment, in response to receiving the user inputs defining the various personal spaces and IoT inventory groups, the recommendation engine may then fetch n-tuple information from one or more IoT devices located in the various personal spaces at block 630. For example, as noted above, the n-tuple information may generally comprise, among other things, profiles, states, contexts, usage patterns, or other relevant information associated with the IoT devices in the defined personal spaces, which the recommendation engine may fetch from the various IoT devices at block 630 using an appropriate IoT communication protocol (e.g., over Wi-Fi, Bluetooth, NFC, etc.). Furthermore, in one embodiment, the n-tuple information may further include one or more ranked associations that the recommendation engine automatically forms between the IoT devices in the defined personal spaces and one or more users, temporal criteria, or other relevant contexts (e.g., using the association and ranking module 512 shown in FIG. 5 and described in further detail above). Additionally, if the defined personal spaces include one or more unconnected items (e.g., passive items or items that otherwise lack capabilities to communicate with the recommendation engine), the recommendation engine may receive one or more user inputs at block 640 to define the unconnected items. In particular, in one embodiment, a user may scan QR codes or barcodes located on the unconnected items, obtain other suitable information to identify the unconnected items (e.g., via a mobile phone application that can capture an image corresponding to an unconnected item and perform some recognition technique to identify the unconnected item), manually input information to identify the unconnected items, or use any other appropriate mechanism to specify details associated with the unconnected items and the personal space(s) to which the unconnected items belong. For example, the QR code located on a sofa may provide details relating to the style, size, model, or other characteristics associated therewith, or the user may manually specify the style, size, model, or other characteristics associated therewith, and so on.

In response to having fetched the various predefined themes and other personal space classifications from the recommendation data server and receiving the various user inputs to define the personal spaces and the IoT inventory group definitions, and fetching the n-tuple information and receiving the user inputs to specify details associated with the IoT inventories in the defined personal spaces, the recommendation engine may then have sufficient information about the IoT environment and the personal spaces therein to assign the fetched themes and other classifications to the defined personal spaces. Accordingly, at block 650, the recommendation engine may then apply the rules and criteria associated with the predefined themes and other classifications that were fetched from the recommendation data server at block 610 to the IoT inventories in the personal spaces that were defined at block 620 based on the n-tuple information fetched at block 630 and/or any user inputs that were received at block 640 to specify the details associated with unconnected items in the defined personal spaces. In particular, the recommendation engine may generally determine whether the rules and criteria associated with any predefined themes or classifications are satisfied at block 650 to assign suitable themes or classifications to the defined personal spaces. For example, in one embodiment, a stainless steel kitchen theme may have rules and criteria that are satisfied if the stainless steel appliances in a kitchen exceed a certain threshold (e.g., 80% of all appliances are stainless steel). In another example, a contemporary house theme may have rules and criteria that are satisfied if the furniture in a house that have a contemporary style meet or exceed a certain threshold (e.g., 80% of overall furniture have a contemporary style).

Accordingly, in response to determining that one or more personal spaces satisfy the rules and criteria associated with any predefined themes, the recommendation engine may assign the corresponding theme (or themes) to such personal spaces at block 660. For example, referring to the exemplary stainless steel kitchen use case mentioned above, the recommendation engine may assign the stainless steel kitchen theme to a personal space that corresponds to a kitchen at block 660 if the kitchen has five stainless steel appliances and six total appliances because the kitchen has 83% stainless steel appliances, which exceeds the 80% threshold associated with the stainless steel kitchen theme. Similarly, referring to the contemporary house use case mentioned above, the recommendation engine may assign the contemporary house theme to a personal space that corresponds to a family room at block 660 if the family room has a leather sectional, a leather chair, and painting that all have a contemporary or modern style because 100% of the items in the family room have a contemporary style, which likewise exceeds the 80% threshold associated with the contemporary house theme. Otherwise, if one or more personal spaces fail to satisfy the rules and criteria associated with any predefined themes, the recommendation engine may indicate that no existing theme applies to the personal space at block 670. However, in one embodiment, the recommendation engine may augment the existing themes and/or allow the user to augment the existing themes to apply to the personal spaces that fail to satisfy the rules and criteria associated with the existing themes at block 680. For example, the existing themes may be augmented at block 680 to add a new theme, update one or more existing themes, or otherwise modify the existing themes that were fetched from the recommendation data server. As such, in response to augmenting the existing themes at block 680, the appropriate new, updated, modified, or otherwise augmented themes may be assigned to one or more personal spaces that otherwise failed to satisfy the rules and criteria associated with the predefined themes that were fetched from the recommendation data server and/or uploaded to the recommendation data server such that the new, updated, modified, or otherwise augmented themes may be used when subsequently assigning themes or classifications to other personal spaces.

Figure 7:
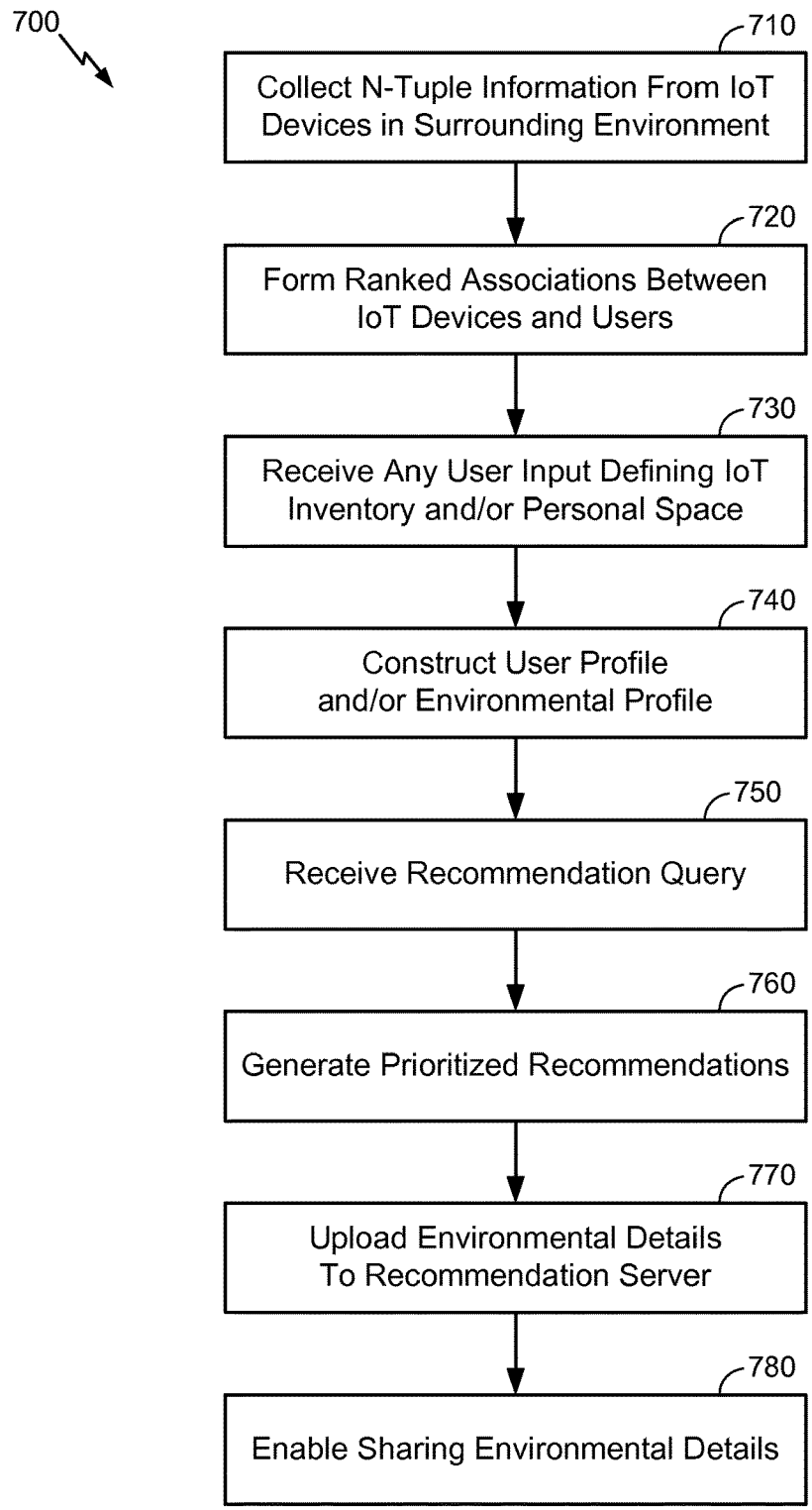
FIG. 7 illustrates an exemplary method that a recommendation engine may perform to provide real-time context aware recommendations based on a user IoT environment according to various aspects of the disclosure.

According to various aspects, FIG. 7 illustrates an exemplary method 700 that the recommendation engine may perform to provide real-time context aware recommendations based on a user IoT environment. More particularly, in one embodiment, the recommendation engine may generally aggregate, filter, and otherwise collect relevant n-tuple information from one or more IoT devices in a surrounding IoT environment at block 710 to obtain relevant real-time knowledge about the various IoT devices in the IoT environment. For example, in one embodiment, the n-tuple information collected at block 710 may comprise, among other things, profiles, states, contexts, usage patterns, or other relevant information associated with the IoT devices in the environment, as described in further detail above.

In one embodiment, the recommendation data server may then form ranked associations between the IoT devices in the environment and one or more users or user groups at block 720, wherein the ranked associations may be based on information that the recommendation engine periodically collects from the IoT devices, user proximities that the recommendation engine detects (e.g., when a user is located in a certain space or within a certain proximity to a given IoT device or other item in the environment). For example, as noted above, the recommendation engine may automatically form associations between IoT devices and one or more specific users and/or user groups based on the device profiles, device states, device usage patterns, user proximities, times, locations, or other suitable information having contextual relevance to the IoT environment. Additionally, in one embodiment, the recommendation engine may further assign rankings to differentiate multiple IoT devices that have the same or substantially similar user associations at block 730. For example, different IoT devices having a similar type can be ranked, different modes in which multi-use IoT devices can be used or otherwise operated can be ranked, and IoT devices having different types or classifications can be ranked. In one embodiment, the rankings may be determined from device usage patterns and respective functionalities that the devices provide, and certain rankings may be common to all users, specific to certain users, and/or differ from one user context to another based on usage patterns, proximities, or other relevant factors. In one embodiment, the recommendation data server may further enable the user to provide one or more user inputs that define, classify, or otherwise characterize passive devices in the IoT environment that do not have communication capabilities or are otherwise not connected to the IoT network and/or input additional details about personal spaces or other aspects within the IoT environment at block 730 (e.g., as described above in connection with blocks 620 and 640 in FIG. 6), wherein the user inputs may be further used to form or refine the ranked associations at block 720.

In one embodiment, the recommendation engine may automatically construct one or more user profiles at block 740 based on usage patterns associated with the IoT devices that the recommendation engine learns over time in combination with other suitable input (e.g., user purchase histories, user online profiles, user demographics, user activities, user inputs, etc.). Furthermore, in one embodiment, the recommendation engine may construct one or more environmental profiles at block 740 to characterize, assign a theme, or otherwise classify the IoT environment or certain personal spaces within the IoT environment (e.g., according to the method 600 shown in FIG. 6 and described in further detail above).

In one embodiment, at block 750, the recommendation engine may receive a recommendation query from one or more users associated with the IoT environment, wherein the recommendation query may indicate details relating to goods or services that the users wish to purchase, activities that the user would like to plan, or any other suitable event or thing in the users' life that could be enhanced with a suitable recommendation. In one embodiment, the recommendation engine may then generate one or more prioritized recommendations at block 760 based on real-time knowledge about the IoT environment, which may include profiles, states, usage patterns, or other contextually relevant knowledge associated with the IoT devices in the environment, the user and/or environmental profiles, the ranked associations, contextually relevant data obtained from a recommendation data server, contextually relevant data acquired from recommendation engines that friends employ, relevant web sites, IoT analytics data, or any other suitable knowledge source. Furthermore, the recommendations may be prioritized to optimize or otherwise improve utilization associated with available resources in the IoT environment wherever applicable (e.g., recommending recipes that use perishable goods nearing an expiration date or a combined shopping trip to save time).

In one embodiment, the recommendation engine can further upload the n-tuple information collected at block 710 or any other relevant real-time information about the IoT environment to the recommendation data server at block 770 to build a larger, community-based knowledge source that can be used to make the recommendations to the user and/or other users. In one embodiment, the recommendation engine may optionally enable the user to approve or disapprove uploading the information to the recommendation data server at block 770, and the recommendation data server may further enable the user to control the access that other users will have to any information that the user approves uploading to the recommendation data server at block 780. For example, the user may only make the information uploaded to the recommendation data server available to users in a friends list (e.g., Facebook friends), only make certain information uploaded to the recommendation server available to other users (e.g., restricting access to potentially sensitive information), make certain information uploaded to the recommendation data server publicly accessible, or any suitable combination thereof. Moreover, in one embodiment, the recommendation engine may allow the user to make the recommendations and/or the information used to make the recommendations available to friends or other users at block 780 even if the user chooses to not upload the recommendations and/or the information used to make the recommendations to the recommendation data server at block 770.

According to various aspects and embodiments, the real-time context aware recommendation engine disclosed herein may reside locally within an IoT environment on any suitable IoT device located therein (e.g., a laptop, desktop, tablet, smart phone, or any other suitable device within the IoT environment). Alternatively, in one embodiment, the recommendation engine may reside on a cloud application server or another suitable server and communicate with devices in the appropriate IoT environment to aggregate information relevant to making the recommendations. However, those skilled in the art will appreciate that the recommendation engine disclosed herein can be implemented or otherwise located on any suitable device that may support the various features associated with the recommendation engine disclosed herein.

Those skilled in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted to depart from the scope of the present disclosure.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The methods, sequences and/or algorithms described in connection with the aspects disclosed herein may be embodied directly in hardware, in a software module executed by a processor, or in a combination of the two. A software module may reside in RAM, flash memory, ROM, EPROM, EEPROM, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in an IoT device. In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, DSL, or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes CD, laser disc, optical disc, DVD, floppy disk and Blu-ray disc where disks usually reproduce data magnetically and/or optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method for providing personalized recommendations in an Internet of Things (IoT) network associated with a user, comprising:
    receiving, at a recommendation engine via a network communications interface, contextual information about one or more IoT devices present in a personal space in the IoT network, the contextual information communicated from the one or more IoT devices to the recommendation engine using a peer-to-peer IoT communication protocol, wherein the contextual information includes state information based on operative conditions associated with the one or more IoT devices;
    constructing, at the recommendation engine, a profile associated with the user based at least in part on one or more patterns in the received contextual information, wherein the one or more patterns are derived from the state information indicating one or more interactions between the user and the one or more IoT devices in the personal space;
    receiving, at the recommendation engine, a recommendation query from the user;
    generating, at the recommendation engine in response to the recommendation query, one or more recommendations to improve the operative conditions associated with at least one of the IoT devices present in the personal space based at least in part on the state information associated with the one or more IoT devices in combination with the constructed profile associated with the user, wherein the one or more recommendations indicate a need to repair or replace the at least one IoT device, wherein the received contextual information includes device profiles that include one or more attributes associated with the one or more IoT devices;

detecting, at the recommendation engine, that the one or more patterns derived from the state information indicate frequent proximity between the user and at least one IoT device among the one or more IoT devices present in the personal space;

associating, at the recommendation engine, the at least one IoT device with the user based at least in part on the device profiles associated with the one or more IoT devices present in the personal space and the detected frequent proximity between the user and the at least one IoT device; and ranking, at the recommendation engine, the one or more IoT devices based at least in part on the state information, wherein the one or more IoT devices are ranked according to an importance to the user, and wherein the one or more recommendations are further prioritized based on the rankings associated with the one or more IoT devices.

2. The method recited in claim 1, further comprising:
determining an inventory associated with the personal space based at least in part on the contextual information about the one or more IoT devices in the personal space and any input received from the user defining unconnected items in the personal space; and
assigning a theme to the personal space based at least in part on the constructed profile associated with the user and the contextual information received from the one or more IoT devices present in the personal space in response to determining that the inventory associated with the personal space satisfies one or more rules associated with the assigned theme, wherein the one or more recommendations are further relevant to the assigned theme.

3. The method recited in claim 1, further comprising:
determining an inventory associated with the personal space based at least in part on the contextual information about the one or more IoT devices in the personal space and any input received from the user defining unconnected items in the personal space; and
defining or augmenting a theme assigned to the personal space in response to determining that the inventory associated with the personal space does not satisfy one or more rules associated with any predefined themes, wherein the one or more recommendations are further relevant to the theme assigned to the personal space.

4. The method recited in claim 1, further comprising assigning a theme to the personal space based at least in part on the constructed profile associated with the user and the contextual information received from the one or more IoT devices present in the personal space, wherein the personal space includes a room, the contextual information indicates a décor of the room, and the theme assigned to the personal space classifies the décor as one of a plurality of given décors.

5. The method recited in claim 1, wherein the received contextual information further includes one or more of, a device state, a user profile, a device usage pattern, a user proximity, a time, a location, or other information having contextual relevance to the IoT network, and wherein the one or more recommendations includes one or more of a recommended activity, a recommended event, a recommended product, or a recommended service.

6. The method recited in claim 1, wherein the user is a first user and ranking the one or more IoT devices further comprises:
ranking the one or more IoT devices based on functionality associated therewith and the state information that indicates the one or more interactions between the first user and the one or more IoT devices in the personal space;
ranking the one or more IoT devices based on functionality associated therewith and the state information that indicates the one or more interactions between a second user and the one or more IoT devices in the personal space;
ranking the one or more IoT devices based on similarities in the respective functionality associated therewith; and
generating a first ranking of the one or more IoT devices according to the importance to the first user and a second ranking of the one or more IoT devices according to an importance to the second user.

7. The method recited in claim 1, wherein generating the one or more recommendations further comprises determining an association between the one or more recommendations and at least one IoT device among the one or more IoT devices present in the personal space that has a high ranking among the one or more ranked IoT devices.

8. The method recited in claim 1, further comprising:
making the contextual information associated with the IoT network available to a trusted set of users.

9. The method recited in claim 1, further comprising:
uploading the contextual information associated with the IoT network to a recommendation data server, wherein the uploaded information includes at least the state information associated with the one or more IoT devices in the IoT network; and
making the uploaded information available to a trusted set of users.

10. The method recited in claim 9, wherein generating the one or more recommendations further comprises:
accessing, from the recommendation data server, recommendations provided to other users that have profiles similar to the constructed profile associated with the user;
acquiring recommendations provided to one or more users in the trusted set of users that have profiles similar to the constructed profile associated with the user; and
fetching data from one or more web sites having a context similar to the constructed profile associated with the user.

11. The method recited in claim 1, wherein the one or more recommendations are further prioritized to improve the operative conditions associated with the one or more IoT devices or efficiently use the one or more available resources communicatively coupled to the IoT network.

12. The method recited in claim 1, wherein:
the IoT network comprises a residence and the contextual information comprises floor plan information and current décor information associated with the residence, and
the one or more recommendations include one or more furnishing items that are concurrently compatible with the floor plan information, the current décor information, and a likely furnishing preference determined from the profile associated with the user.

13. The method recited in claim 1, further comprising:
providing a recommendation application to receive input from the user that specifies further information associated with the IoT network not collected from the one or more IoT devices in the IoT network.

14. A recommendation engine, comprising:
a transceiver configured to receive, via a network communications interface, contextual information about one or more Internet of Things (IoT) devices present in a personal space in an IoT network associated with a user, the contextual information communicated from the one or more IoT devices to the recommendation engine using a peer-to-peer IoT communication protocol;
a memory configured to store the contextual information received from the one or more IoT devices present in the personal space, wherein the stored contextual information includes state information based on operative conditions associated with the one or more IoT devices; and
one or more processors configured to:
construct a profile associated with the user based at least in part on one or more patterns in the stored contextual information, wherein the one or more patterns are derived from the state information indicating one or more interactions between the user and the one or more IoT devices in the personal space;
receive a recommendation query from the user;
generate, in response to the recommendation query, one or more recommendations to improve the operative conditions associated with at least one of the IoT devices present in the personal space based at least in part on the state information associated with the one or more IoT devices in combination with the constructed profile associated with the user, wherein the one or more recommendations indicate a need to repair or replace the at least one IoT device, wherein the received contextual information includes device profiles that include one or more attributes associated with the one or more IoT devices;
detect that the one or more patterns derived from the state information indicate frequent proximity between the user and at least one IoT device among the one or more IoT devices present in the personal space;
associate the at least one IoT device with the user based at least in part on the device profiles associated with the one or more IoT devices present in the personal space and the detected frequent proximity between the user and the at least one IoT device; and
rank the one or more IoT devices based at least in part on the state information, wherein the one or more IoT devices are ranked according to an importance to the user, and wherein the one or more recommendations are further prioritized based on the rankings associated with the one or more IoT devices.

15. The recommendation engine recited in claim 14, wherein the one or more processors are further configured to:
determine an inventory associated with the personal space based at least in part on the contextual information about the one or more IoT devices in the personal space and any input received from the user defining unconnected items in the personal space; and
assign a theme to the personal space based at least in part on the constructed profile associated with the user and the contextual information received from the one or more IoT devices present in the personal space in response to the inventory associated with the personal space satisfying one or more rules associated with the assigned theme, wherein the one or more recommendations are further relevant to the assigned theme.

16. The recommendation engine recited in claim 14, wherein the one or more processors are further configured to:
determine an inventory associated with the personal space based at least in part on the contextual information about the one or more IoT devices in the personal space and any input received from the user defining unconnected items in the personal space; and
define or augment a theme assigned to the personal space in response to the inventory associated with the personal space failing to satisfy one or more rules associated with any predefined themes, wherein the one or more recommendations are further relevant to the theme assigned to the personal space.

17. The recommendation engine recited in claim 14, wherein the one or more processors are further configured to make the contextual information available to a trusted set of users.

18. The recommendation engine recited in claim 17, wherein the one or more processors are further configured to:
access, from a recommendation data server, recommendations provided to other users that have profiles similar to the constructed profile associated with the user;
acquire recommendations provided to one or more users in the trusted set of users that have profiles similar to the constructed profile associated with the user; and
fetch data from one or more web sites having a context similar to the constructed profile associated with the user.

19. A non-transitory computer-readable storage medium having computer-executable instructions recorded thereon, wherein executing the computer-executable instructions on a computer causes the computer to:
receive, via a network communications interface, contextual information about one or more Internet of Things (IoT) devices present in a personal space in an IoT network associated with a user, the contextual information communicated from the one or more IoT devices to the recommendation engine using a peer-to-peer IoT communication protocol;
store the contextual information received from the one or more IoT devices present in the personal space, wherein the stored contextual information includes state information based on operative conditions associated with the one or more IoT devices;
construct a profile associated with the user based at least in part on one or more patterns in the stored contextual information, wherein the one or more patterns are derived from the state information indicating one or more interactions between the user and the one or more IoT devices in the personal space;
receive a recommendation query from the user; and
generate, in response to the recommendation query, one or more recommendations to improve the operative conditions associated with at least one of the IoT devices present in the personal space based at least in part on the state information associated with the one or more IoT devices in combination with the constructed profile associated with the user, wherein the one or more recommendations indicate a need to repair or replace the at least one IoT device, wherein the received contextual information includes device profiles that include one or more attributes associated with the one or more IoT devices;

detect that the one or more patterns derived from the state information indicate frequent proximity between the user and at least one IoT device among the one or more IoT devices present in the personal space;

associate the at least one IoT device with the user based at least in part on the device profiles associated with the one or more IoT devices present in the personal space and the detected frequent proximity between the user and the at least one IoT device; and rank the one or more IoT devices based at least in part on the state information, wherein the one or more IoT devices are ranked according to an importance to the user, and wherein the one or more recommendations are further prioritized based on the rankings associated with the one or more IoT devices.

20. The non-transitory computer-readable storage medium recited in claim 19, wherein executing the computer-executable instructions on the computer further causes the computer to:

determine an inventory associated with the personal space based at least in part on the contextual information about the one or more IoT devices in the personal space and any input received from the user defining unconnected items in the personal space; and assign a theme to the personal space based at least in part on the constructed profile associated with the user and the contextual information received from the one or more IoT devices present in the personal space in response to the inventory associated with the personal space satisfying one or more rules associated with the assigned theme, wherein the one or more recommendations are further relevant to the assigned theme.

21. The non-transitory computer-readable storage medium recited in claim 19, wherein executing the computer-executable instructions on the computer further causes the computer to:

determine an inventory associated with the personal space based at least in part on the contextual information about the one or more IoT devices in the personal space and any input received from the user defining unconnected items in the personal space; and define or augment a theme assigned to the personal space in response to the inventory associated with the personal space failing to satisfy one or more rules associated with any predefined themes, wherein the one or more recommendations are further relevant to the theme assigned to the personal space.

22. The non-transitory computer-readable storage medium recited in claim 19, wherein executing the computer-executable instructions on the computer further causes the computer to make the contextual information available to a trusted set of users.

23. The non-transitory computer-readable storage medium recited in claim 22, wherein executing the computer-executable instructions on the computer further causes the computer to:

access, from a recommendation data server, recommendations provided to other users that have profiles similar to the constructed profile associated with the user;

acquire recommendations provided to one or more users in the trusted set of users that have profiles similar to the constructed profile associated with the user; and fetch data from one or more web sites having a context similar to the constructed profile associated with the user.

24. The method recited in claim 1, wherein the one or more recommendations are further based at least in part on real-time knowledge about an existing inventory in the personal space.

25. The method recited in claim 24, wherein the one or more recommendations are further based one or more temporal criteria.

* * * * *